United States Patent [19]

Berlowitz-Tarrant et al.

[11] Patent Number: 5,779,960
[45] Date of Patent: *Jul. 14, 1998

[54] ALGAL PLASTICS

[75] Inventors: Laurence Berlowitz-Tarrant, Harvard, Mass.; Toshimasa Tukumo, Tokyo, Japan; Satya Shivkumar, Worcester, Mass.

[73] Assignee: International Technology Management Associates, Inc., Harvard, Mass.

[*] Notice: The term of this patent shall not extend beyond the expiration date of Pat. No. 5,352,709.

[21] Appl. No.: 317,936

[22] Filed: Oct. 3, 1994

Related U.S. Application Data

[63] Continuation-in-part of Ser. No. 11,408, Jan. 29, 1993, Pat. No. 5,352,709.

[51] Int. Cl.⁶ .................................................. C08L 5/00
[52] U.S. Cl. ........................... 264/176.1; 264/209.1; 264/211; 264/211.1; 264/211.11; 524/47; 525/54.3
[58] Field of Search .................. 525/54.1, 54.3; 521/84.1; 264/176.1, 209.1, 211, 211.1, 211.11; 524/47

[56] References Cited

U.S. PATENT DOCUMENTS

| | | | |
|---|---|---|---|
| 2,487,162 | 11/1949 | Meyer et al. | 426/420 |
| 3,764,341 | 10/1973 | Carbonniere | 426/74 |
| 4,744,996 | 5/1988 | Rakow et al. | 426/575 |
| 5,352,709 | 10/1994 | Tarrant et al. | 524/9 |

OTHER PUBLICATIONS

Translation of JP63-94952 (Apr. 1988).

*Primary Examiner*—Jeffrey C. Mullis
*Attorney, Agent, or Firm*—Lahive & Cockfield, LLP; Giulio A. DeConti, Jr.; Mark D. Russett, Ph.D.

[57] ABSTRACT

This invention pertains to foamed and solid algal plastics and products made therefrom, and methods for making algal plastics. The invention also pertains to algal plastic resin precursors for generating the foamed and solid algal plastics and algal plastic products. The foamed algal plastics comprise a foamed and stabilized filamentous algal fiber matrix having substantial dimensional stability. The foamed algal plastics can be used, for instance, to generate packing materials, such as molded packings or foamed particles packings (e.g. packing peanuts). The solid algal plastics comprise a stabilized filamentous algal fiber matrix having substantial dimensional stability. They can be formed from any plastic forming process, such as molding, extrusion, calendering, casting and thermoforming and can be used to make a wide variety of solid plastics, such as, for example, films, rods, tubes, sheets, containers, and shaped forms, such as golf tees. The invention also pertains to cements comprising a stabilized filamentous algal fiber matrix having substantial water retentive capability.

23 Claims, No Drawings

ALGAL PLASTICS

This application is a continuation-in-part application of U.S. application Ser. No. 08/011,408 filed Jan. 29, 1993 (U.S. Pat. No. 5,352,709, issuing on Oct. 4, 1994), entitled "Algal Plastics" and assigned to the assignee of the instant invention.

BACKGROUND OF THE INVENTION

Foamed packing materials have become a major component of the packing industry because of their strength, light weight, and shock absorptive and insulating capacities. Until recently nearly all of the foamed packing materials, loose and molded, were made from polystyrene resins. These resins have excellent properties, and form the standard against which other packing materials are measured.

Solid foamed packing materials are used wherever optimum inherent shock absorbency and thermal insulation are required. The former is the most important factor in solid molded packings for shipping protection of electronics and other fragile materials including business machines, electrical components, computers, tools, major appliances, hardware, and toys. The latter is more important in applications such as cups for hot liquids or molded packings for the insulation of warm foods. Cups for hot liquids obviously also depend upon non-dissolution of these materials in water.

The majority of plastics fall into the category of petro-plastics, which are a non-energy product of petroleum chemicals. Petroleum-based plastics are considered to be nonbiodegradable, or at best only slowly biodegradable, e.g., decomposable by microorganisms or other natural events. This, coupled with the amount of plastics produced and ending up as litter or in landfills, is primarily responsible for the activity towards plastics that are biodegradable. In the U.S. alone, about 58 billion pounds of petroleum-derived plastics were produced in 1989. Municipal solid waste contains 7% by weight and 17–25% by volume of plastics, largely from packing materials. While traditional plastics can be altered to enable facile chemical degradation, the toxicity of the residues have yet to be defined.

Replacement of petrochemically based plastics by biologically derived plastics would reduce petroleum usage. Litter from such plastics would disappear into its surroundings to leave only normal biological residues. Integrated waste management practices that include off-landfill composting of biodegradable wastes, incineration, some reduction of packaging materials, and recycling could help bring waste disposal under control.

For several years there has existed an interest in developing biodegradable loose packings from vegetable materials. These materials are generally made from corn and other starches and can include the addition of other materials which act to enhance polymerization, chemical crosslinking, or flexibility. These loose packings have been formed by a variety of standard foaming and extrusion methods derived from polystyrene foam production, or the extrusion or explosive popping of cereal foods. However, these largely starch-based materials are often not well suited for many applications of solid packing foams because of their relatively rapid breakdown under wet conditions, and their inherently low breaking and compressive strengths.

SUMMARY OF THE INVENTION

This invention pertains to foamed and solid algal plastics and products made therefrom, and to methods for making foamed and solid algal plastics. The invention also pertains to algal plastic resin precursors for generating the foamed algal plastics and algal plastic products.

The invention also pertains to cements made from a stabilized filamentous algal fiber matrix and to concretes comprising an aggregate, water, and a cement, wherein the cement comprises a stabilized filamentous algal fiber matrix having substantial water retentive capability.

The foamed algal plastics comprise a foamed and stabilized algal fiber matrix having substantial dimensional stability. The foamed algal plastics can be used, for instance, to generate packing materials, such as molded packings or loose particles packings (e.g. packing "peanuts"). The solid algal plastics comprise a stabilized algal fiber matrix having substantial dimensional stability. They can be formed into a wide variety of shapes, such as by extrusion, molding, calendering, casting and thermoforming.

The algal plastics and algal plastic precursors are made from filamentous green algae of the Division Chlorophyta, Class Chlorophycaeae, and Order Cladophorales, and include at least the following genera: Cladophora, Chaetomorpha, Rhizoclonium, Pithophora, Valonia, Valoniopsis, Cladophoropsis, Boergesenia, Anadyomene, Microdictyon, Boodlea, Chamaedoris, and Dictyosphaeria. For example, the species Cladophora glomerata Kuetzing, a filamentous green algae, can be used to form the algal plastics of the present invention.

The algal plastics can also include application additives, such as antioxidants, antistatic agents, compatibilizers, flame retardants, heat stabilizers, water repellents, impact modifiers, lubricants, ultraviolet stabilizers, biocides, pigments, colorants, fillers, impact modifiers/plasticizers, foam stabilizers, viscosity modifiers, and combinations thereof. The application additives can be mixed into an algal pulp before or concurrently with the generation of the algal fiber matrix, or can be used to coat the already formed algal plastic. For example, the algal plastic can include, an additional polysaccharide component, such as unmodified vegetable starches, modified vegetable starches, alginates, glucose-amino-glycans, hexosamines, pentosans, guar gums, cellulose, methylcellulose, hydroxypropyl cellulose, ellulose, hydroxypropylmethylcellulose, hydroxypropylbutylmethylcellulose, sodium carboxy methylcellulose, polyvinyl- pyrrolidone bentonite, agar, dextran, chitin, polymaltose, polyfructose, pectin, and combinations thereof. For instance, a high gluten starch, such as starch isolated from sticky rice, can be added to the algal pulp and incorporated into the algal fiber matrix of the plastic.

The foamed algal plastics are preferably formed by subjecting a filamentous green algal pulp to foaming process which produce cellular plastic foams, including, for example, isocyanate base techniques, volatilization of component(s) of the algal pulp such as blowing agents or water, vacuum expanding gases dissolved in the algal pulp, whipping gases into the algal pulp, and dissolving crystals or other small particles into the pulp and subsequently removing them after stabilization of the foam. However, irrespective of the particular foaming process used, the resulting algal plastic should comprise a homogeneously interwoven fiber structure.

The algal plastics and algal plastic products of the present invention provide unique advantages. For instance, in terms of environmental concerns, the use of filamentous algae in plastic engineering can lead to a decreased use of synthetic polymers which would otherwise require the use of a greater amount of environmentally hazardous chemicals, such is of concern when petrochemical are used. The algal plastics can be formulated so as to be biodegradable and/or recyclable. Furthermore, the dimensional stability qualities of the filamentous algal plastics can be within the range of synthetic plastics used in the same or similar applications. Also, the substantial water absorbing and retaining capacity of the filamentous algal fiber matrix makes it a highly suitable strength enhancer in concretes and cements.

DETAILED DESCRIPTION OF THE INVENTION

The algal fibers and algal plastic resins described herein are well-suited to the formation of both loose and solid packings. Where desirable, the components of the algal plastics can be chosen so as to produce an end product made so as to be almost entirely biodegradable.

The algal fibers, pulps, resins, and plastics described herein are unique structural combinations of cellulose, hemicelluloses, sugars, and proteins. It has been discovered that filamentous algae are well-suited as raw materials for molded foams and other plastic applications as they contain polysaccharides (large, complex carbohydrate chains) such as cellulose, as inherent structural components of the cell walls. These structural components can be manipulated to form the fibrous matrix of the algal plastics described herein. In most instances, the cellulose is arrayed in long fibers made up of complex microfibrillar layers. Other materials that can play an important role in certain molding processes and in the dimensional stability and strength of the resulting algal plastics are also found in filamentous algae, and include sugars rich in hydroxy groups as well as structural glucosamines and proteins.

The organisms specified for use for the purposes set forth in this patent application are filamentous green algae of the Division Chlorophyta, Class Chlorophycaeae, and Order Cladophorales. Among the green algae in the Class Chlorophyceae, the filamentous algae of the order Cladophorales are especially well suited for making the algal plastics of the present invention. These algae have long macrofibrillar structures made up of cellulosic chains, and the underlying structure of these microfibrillar layers is complex and inherently strong. Additionally, algae of the order Cladophorales are particularly rich in cellulose, an important structural component.

Moreover, some of these filamentous algae, such as *Cladophora glomerata* (L.) Kützing, have become major ecological pests, reaching massive nuisance proportions as a result of eutrophication caused by pollutants in effluent from industry, agriculture and urban sewage. The organism adversely affects navigation, recreation, water quality, and property values. 30-percent of the aquatic herbicides used in the U.S. are for control of this pest. In addition to the benefits derived from the use of *C. glomerata* as a biodegradable replacement for polystyrene resins in such applications as foamed packing materials, its industrial use further represents an opportunity for cost effective, ecologically responsible pest control. Furthermore, some of the algae useful in generating the algal plastics of this invention may be grown in waste streams and effluent ponds from industrial and domestic waste disposal, and present an opportunity for a new renewable industrial resource to be grown in habitats not currently exploited.

The order Cladophorales is defined here to include at least the following genera: Cladophora, Chaetomorpha, Rhizoclonium, Pithophora, Valonia, Valoniopsis, Cladophoropsis, Boergesenia, Anadyomene, Microdictyon, Boodlea, Chamaedoris, and Dictyosphaeria. Because of the taxonomic state of flux, the order Cladophorales is further defined to include any filamentous green alga of the class Chlorophyceae with the cell wall characteristics, general chemical and physical composition, and structure and function as described above. The preferred species with reference to this invention are Cladophora spp., especially *Cladophora glomerata* Kuetzing, Chaetomorpha spp., Pithophora spp., and Rhizoclonium spp.

The species of preference to be harvested under current world conditions of pollution eutrophication is *Cladophora glomerata* Kuetzing. Worldwide, this species has the widest distribution and greatest biomass of all the filamentous green algae. In addition, this species is of the genus having the second highest proportion of cellulose I (a highly crystalline form of cellulose) microfibrils in its cell walls. However, it will be appreciated by those skilled in the art that other Cladophora spp., Chaetomorpha spp., Pithophora spp., and Rhizoclonium spp., all contain cellulose I in their cell walls and can be utilized for the various formulations and applications described below.

For culturing, *Cladophora glomerata* Kuetzing, Chaetomorpha spp., Pithophora spp., and Rhizoclonium spp. will be used preferentially. Pithophora spp., for example, are generally free floating and tend to prefer non-flowing water, which makes them an excellent candidate for culture in polluted effluent pools. Ultimately, however, whichever cladophoralean species is most amenable to being bred or biologically engineered to provide the highest yields of the best quality cellulose and related hydrogen bond-inducing polysaccharides will be used. Strain improvement can be carried out by breeding under standard laboratory conditions of monoalgal culture, or by introducing genes using recombinant manipulation of the genome.

It is the inherent fibral and macrofibral structure of the cladophoraleans that make them particularly suited as raw materials for the production of foamed and solid packing materials. The complex microfibrillar structure in the Cladophorales can result in fibers having effective lengths on the order of a meter or more, and can be an important factor in the structural integrity, dimensional stability and strength of foamed and solid packing materials made from filamentous green algae. These fibers are comprised primarily of cellulose I, a strong form of the polymer, and may also contain other strong structural materials such as glucosamines. The strength of these fibers is the result of the inherent cross-fibrillar structure described above.

In particular, it is important that articles made from algal plastics retain sufficient strength, dimensional stability and compressibility to perform their desired function (e.g. sufficient dimensional stability to serve as a packing material), and in some instances, maintain dimensional stability in humid air. For instance, the dimensional stability of the algal foam plastic can be within a range designated by the useful characteristics of extruded polystyrene and expanded polystyrene for the same or similar application as the algal foam plastic is being used in. The tensile and compressive strengths of the final foamed product are influenced not only by the fibrillar structure itself, but can be influenced by the hydrogen bonding capacities of the accompanying hemicelluloses. The polysaccharides within the filamentous structure can also function as inherent polysaccharide glues that can further add cohesiveness to the foamed packing product. Finally, in many applications, the article must also be recyclable and/or biodegradable after disposal. While the porosity and vegetative content of foams made from these algae make them inherently biodegradable, their relative hydrophobicity makes them slow to absorb moisture and thus slow to break down in normal use.

Furthermore, these structures are surrounded by polysaccharide materials and sugars which can participate in stable foaming reactions so as to alleviate any need to substitute synthetic materials such as synthetic polyols. The integral high hemicellulose content of these filamentous algae, with its high hydroxyl group content, can be particularly advantageous for this purpose. The water soluble sugars, under dry pulping conditions, may also contribute to various foaming reactions. Even the inherent moisture content of the dried algal resins or pulps can be important to, for example, in steam explosion methods of foaming.

The systematics of the order Cladophorales are summarized as follows. The order Cladophorales specifies straight chain and branched filamentous plants composed of cells joined end to end, with or without multinucleated cells, and generally surrounded by a continuous cuticle to form a filament. This is in contrast to other orders of the class Chlorophycaeae, which comprise plants of unicellular or colonial cell arrangements. The filaments are attached to the substrate by rhizomes or are free floating. The cells contain numerous discoid angular chloroplasts forming a parietal reticulum, but they may extend into the internal meshes of the protoplasmic foam. The main wall polysaccharide is a highly crystalline cellulose (cellulose I), forming numerous lamellae of microfibrils in a crossed fibrillar pattern. In at least one species, Pithophora, the outer walls and cross walls contain n-glucosamines (chitin) as well as cellulose I. One or more species may contain silica in their outer cell walls. Reproduction can be by either sexual or asexual means.

The extremely complex and exact system of wall formation in the Cladophorales suggests that deposition and orientation of microfibrils is under very precise control and that the production and orientation of microfibrils is a function of the outermost layer of cytoplasm. The set of microfibrils are deposited in the sporeling cells with the first to be deposited making a small angle to the transverse axis, followed by the second at a greater angle, and finally the third, when present. The rhythm of deposition is retained by the daughter cells through several cell divisions so that adjacent cells in a filament have the innermost lamellae lying in the same direction. The result of this orientation of lamellae is a strong and dimensionally stable structure.

Filamentous algal microfibrils normally are synthesized through the formation of terminal synthesizing complexes (TC), containing enzymes and other factors at their growing tip. TC structure determines final microfibrillar assembly in the cell walls of filamentous algae. There are two basic forms of these TC-s: rosettes and linear.

The interactions of the chemical and physical properties of the cell walls of filamentous green algae provide form, strength and stability. These properties include:

1. Microfibrillar lamellae composed of cellulose I.
2. An amorphous matrix composed of polysaccharides, between the inner and outer walls or the filaments, which surrounds the microfibrillar lamellae.
3. Hemicelluloses concentrated on the outer surfaces of the microfibrils.
4. Chitin and chitosan in the outer and cross walls of some species.
5. Silica in the outer wall of some species.
6. Proteins, glycoproteins and heteropolysaccharides.

In general, the filaments of the cladophoralean algae are composed of cells enclosed by a double cell wall. The inner wall encloses individual cells, while the thinner outer wall ensheathes the whole filament. The mass of the cell wall is made up mostly of microfibrillar elements which provide rigidity and strength. The most common component of the microfibrils is the polysaccharide, cellulose. In the Cladophorales, cellulose I, or native cellulose, a highly crystallized form of cellulose, is present in all the species of the genera Cladophora, Chaetomorpha, Pithophora and Rhizoclonium, whereas it is replaced by cellulose II (a less polymerized form of cellulose with irregularly disposed molecules) in all Spongomorpha spp. The percentage of microfibrillar material in the genus Cladophora is about 28.5%, and in the genus Chaetomorpha is in the range of 36.5–41%.

In the cell wall, cellulose is usually laid down in the form of lamellae running in two directions, in steep or slow spirals, almost at right angles or with a third lamellae, if present, as in some species of Cladophora, Chaetomorpha and Valonia, in which the fibrils run in the obtuse angle between the other two. The third spiral is not always present, in which case the cell wall is a repeating two lamellae structure. Uniquely, microfibrils are interwoven between different bands of lamellae. The microfibrils of the side walls are continuous with those of the cross wall. The result of this interwoven, crosslinked microfibril pattern is a relatively rigid, structurally strong and dimensionally stable algal fiber matrix. The microfibrillar lamellae are in general surrounded by a water soluble amorphous material also composed of polysaccharides.

The polysaccharide composition of cladophoralean cell walls is, in general, as follows:

Cellulose microfibrils—Glucose, galactose, arabinose and xylose.

Water soluble fraction—Uronic Acid, galactose, glucose, arabinose, xylose.

Hemicellulose fraction—Galactoglucomannan, arabinoglucuronoxylan.

Other sugars represent the constituents of glycoproteins and heteropolysaccharide fragments that are linked to each other or to cellulose. Protein related in structure to collagen are also found.

In many applications, the foamed algal fiber matrix which is created can have a low water content. In situations where its use requires a low inherent moisture content, the algal plastic can be dehumidified either in a step subsequent to the foaming process, or as part of the foaming process itself. Low moisture requirements may arise, for example, where the packing material will come in contact with moisture-sensitive material during its use, as well as where the stability of the algal fiber matrix is influenced by the moisture-content of the plastic.

For packing materials, the choice of filamentous algal resin to be created can often depend on the desired foaming and forming methodology used to create the algal plastic end products. By way of illustration, if an extrusion method for forming loose packings is used which is similar to the extrusion of polystyrene loose packing, it may be desirable to reduce fiber lengths during a pulping step, and release the hemicelluloses and starches from the algal mass in order to maximize the crosslinking which can occur, thereby optimizing the dimensional stability and strength of the resulting algal plastic. The ensuing pulp can then be cooked to a temperature where the hemicelluloses form an amorphous mass with the fibers embedded therein and create a relatively translucent resin that can be pelletized so as to contain a sufficient moisture content to explode upon heating in an extruder. If desired, the "popped" algal plastic can then be cut from the mass into shaped loose packings. Similar resins can be generated for use with microwave explosion puffers such as described by the Spratt et al. U.S. Pat. No. 4,990,348, incorporated by reference herein.

For the solid packing materials described herein, any pulping method, such as ones developed for paper and can be used to prepare an algal resin, but the pulping method is preferably chosen on the basis of minimal damage or destruction of the inherent fiber structure of the filamentous algae used. (See, for example, commonly assigned U.S. patent application Ser. No. 07/928,978 entitled "Algal Pulps and Prepulps and Products Made Therefrom", incorporated by reference herein). It will be appreciated that the desired end product can control which particular pulping methodology is selected. Pulping and fiber preparation used in wood and nonwood-fiber processes (see, for example, *Pulp and Paper Chemistry and Chemical Technology*, vol. I ed. James Casey (1980) Wiley & Sons, New York; *Papermaking*, ed. Francis Bolam (1965) Clowes & Sons, London, chapters 4 and 5; *Chemical and Mechanical Pulping*, ed. James Casey (1984) Marcel Dekker, New York; and *Joint Textbook Committee of the Paper Industry*, ed. T. Grace and E. Malcolm (1989) TAPPI, Atlanta, all incorporated by reference herein) are generally applicable in making the cladophoralean pulps of the present invention.

For most algal plastics, the object of pulping will be to maximize the retention of the fibrous structure of the alga and optimize the ability of the fibers to crosslink. Therefore gentle, largely mechanical methods will generally be desirable. On the other hand, depending on the foaming method used, a pulping process can be employed which is designed to optimally expose or alter the inherent surface chemistry of the various polysaccharide components of the algal fiber. This is especially important, for example, when the method of forming the final foam involves the reacting of the hydroxyl groups of the resin with isocyanate to produce a cross-linked, strong material with a high percentage of algal fiber as its principal component.

Cladophoralean algal pulps can be produced by mechanical pulping, by gentle chemical action and selective extraction, by biological pulping, or by combinations thereof. The pulping method selected should 1) retain or create the optimum fiber length for the application, and 2) differentially select and/or expose the hemicelluloses and other sugar polymers so as to increase the hydroxyl group ratio or promote optimum hydrogen bonding capacity or increase the total proportion of cellulose in the mix, to ensure maximum crosslinking in the algal resin. It is to be understood that these extraction methods are always selected such that, except for transverse shearing, they would leave the algal filament structure substantially intact.

Mechanical pulping of the algae can be performed using any of several different mechanical pulping techniques useful in pulping wood and non-wood fibers. Generally, the length of the fiber desired in the algal plastic will determine which process is used, as well as the duration of pulping. Examples of mechanical pulping processes include the use of disc refiners, grinders, and whirling blade blenders. In addition, beating and refining can be carried out on the pulp as a part of the mechanical treatment of pulp. Often these processes are carried out in the presence of water, usually by passing the suspension of pulp fibers through a relatively narrow gap between a revolving rotor and a stationary stator, both of which carry bars or knives aligned more or less across the line of flow of the stock. One major effect of beating and refining is to produce an increase in the specific surface of the pulp fibers. The term "beating" is usually applied to the batch treatment of stock, for instance in a Hollander beater or one of its modifications. The term "refining" is used when stock is passed continuously through one or more refiners in series or in parallel. Examples of refiners useful in the present invention include the disk, conical, or wide-angle types.

In addition to mechanical beating processes, ultrasonic treatment of the pulp, using high-intensity sound waves to transfer energy to the pulp fibers, can be utilized for beating.

Examples of chemical processes useful in the present invention for pulping of cladophoralean algae include reactions based on the use of alkaline sulfite, acid sulfite, neutral sulfite, sulfate (Kraft and Green Liquor), bisulfite, and polysufide. In addition, non-sulfur chemical pulping processes include caustic soda (such as cold soda), soda-AQ (sodium hydroxide and anthraquinone), sodium bicarbonate, and soda-oxygen reactions.

These chemical processes can be combined with mechanical fiberizing or pulp disintegrating steps, such as disc refining or beating, to yield chemimechanical pulping processes. For instance, the algal mass can be soaked in cold sodium hydroxide solution, or treated by an alternate chemical method, for shorter periods of time and/or with smaller proportions of chemicals. The partially pulped algae can then be subjected to a mechanical fiberizing step to produce a finer more dispersed pulp. However, regardless of the pulping process used, the objective is always to preserve and maximize the quantity and accessibility of the algal fibers within the algal resin to provide optimum crosslinking of the algal fibers and thus impart optimum dimensional stability and strength in the resulting algal plastic.

Thermomechanical or chemithermomechanical pulping processes can also be used which involve the application of thermal energy in conjunction with mechanical force to the algal mass as a principal pulping means. In the instance of thermomechanical pulping, the pulp produced will generally contain longer fibers and higher hemicellulose levels than can be produced by most chemical and chemimechanical pulping techniques.

Further, biological pulping processes comprising the liberation of cellulosic fibrils by enzymatic digestion of the algae can be used to produce the algal pulp. These processes can be utilized to digest non-cellulosic components of the algae, as well as to alter the characteristics of the cellulosic fibers themselves, so as to expose fibers and promote crosslinking. For example, biological pulping can be carried out by the use of purified or semi-purified enzymes, or alternatively, by treatment with whole microorganisms (both naturally-occurring and engineered) which act to digest components of the algae in the pulp formation process.

In the production of algal plastics according to the present invention, it will generally be desirable to produce algal pulps using pulping methods designed to expose the optimal number of hydroxyl groups. Exposure of hydroxyl groups can be accomplished, for instance, by at least partial disruption of the fibrillar structures to expose portions of the microfibrillar elements ordinarily buried in the fiber. When the foaming procedure used to generate the algal plastic comprises a non-polar method, such as urethane foaming, it may be beneficial to use a dry refining/pulping procedure or involve the use of supercritical extraction/reaction conditions. For example, exposure of the hydroxyl groups by dry pulping can be carried out by a blender procedure using a minimum of water. Under those conditions, resins are produced that can be either dried and briefly ground before addition to the foaming mixture, or used as is, depending on the foaming process chosen. For instance, in a production process, a refiner can be used with a narrow blade aperture to accommodate the thinness of algal fibers by passing the suspension of pulp fibers through a relatively narrow gap between a revolving rotor and a stationary stator.

For aqueous foaming methods, wet pulping methods can be employed. For instance, mechanical wet pulping can be used advantageously both to preserve and expose more of the hydroxyl-bearing molecules to promote crosslinking of the fibers. In some case, it may be advantageous to "soak" the algal fibers in order to swell or expand them. In addition, following refining of the algal fibers, the pulp may be treated chemically or enzymatically to further expose hydroxyl groups of the hemicellulose. It is clear though, that in the instance of non-polar foaming methods, wet pulping techniques can be used with the resulting pulp dried before foaming. Alternatively, for aqueous foaming techniques, dry pulping methods can be used and the pulp subsequently hydrated.

The algal plastics of the present invention may include at least one of an array of plastic additives that can improve the performance, strength and dimensional stability of the algal plastic or overcome processing problems. Suitable algal plastic additives include antioxidants, antistatic agents, chemical blowing agents, compatibilizers, flame retardants, heat stabilizers, impact modifiers, water repellents, lubricants, ultraviolet stabilizers, biocides, pigments and colorants, fillers and reinforcement plasticizers, foam stabilizers, and viscosity modifiers. It will be obvious to those skilled in the art to determine under which conditions particular additives will be useful, as well as to what extent a particular additive will effect biodegradability of the ultimate algal plastic.

Antioxidants are well known additives and can help retard the oxidative degradation of the algal plastic or its components. Degradation is often initiated when free radicals are created in the plastic by heat, ultraviolet radiation, mechanical sheer, or metallic impurities. When a free radical is formed, a chain reaction begins which initiates oxidation of the algal plastic components. Reaction of the radical with an oxygen molecule can yield a peroxy radical, which can then react with an available hydrogen atom to form an unstable hydroperoxide and another free radical. In the absence of an antioxidant, these reactions become self-propagating and can lead to degradation of the algal plastic.

Generally speaking, antioxidants useful in the present invention can be categorized into two basic types, primary and secondary. Primary antioxidants intercept and stabilize free radicals by donating active hydrogen atoms. Hindered phenols (e.g. thiobisphenols and alkylidenbisphenols) and aromatic amines represent two types of primary oxidants useful in the present invention. Secondary antioxidants can prevent formation of additional free radicals by decomposing the unstable hydroperoxides into a stable product. Phosphites and thioesters are examples of useful secondary antioxidants. Secondary antioxidants, or synergists, can be used along with primary antioxidants in the algal plastic formulations.

Many of the algal plastics described herein may be inherently antistatic. However, there may be instances where it will be desirable to treat the algal plastic with standard antistatic agents to increase their utilization with electrically-sensitive equipment, such as required in packing for electronic parts. Antistatic agents, when formulated in or coated on the algal plastics of the present invention, can dissipate static electrical charges. Dissipating static electricity can prevent problems such as sparking, dust attraction, or interference during processing. There are two types of antistatic agents which can be employed in algal plastic manufacture, external aid internal. External, or topical, antistatic agents can be applied to the surface of the algal plastic through techniques such as spraying, wiping, or dipping. Internal antistatic systems can be compounded into the algal resin during processing. These agents can have the ability to replenish the algal plastic's antistatic protection, which might be worn off during handling, through a process called blooming (the migration of the antistatic agent to the algal plastic's surface). The internal antistatic agent can thus offer long-term protection against static electrical charges. Useful antistatic agents for the present invention include hygroscopic compounds which absorb moisture from the surrounding air, and create a conductive layer of water on the polymer surface that disperses the charge. Examples of such hygroscopic compounds include quaternary ammonium compounds and amines, and their associated derivatives. Phosphate and fatty acid esters, polyhydric alcohol derivatives, sulfated waxes, ethoxylated and propoxylated aliphatics and aromatics, and other materials can also be used.

Compatibilizers are agents that can provide permanent miscibility or compatibility between otherwise immiscible or partially immiscible components of the algal plastic, thereby creating homogenous materials that do not separate into their component parts. The compatibilizers of the present invention can function as solid polymeric surfactants, in that they promote miscibility by reducing interfacial tension. These compatibilizing agents can be further classified as reactive and nonreactive. Reactive compatibilizers chemically react with the algal plastic systems during compounding, and they are effective across generally broader ranges of systems than are nonreactive types. However, the degree of compatibilization they provide depends strongly upon compounding conditions. Nonreactive compatibilizers, which are often block or graft copolymers, interact physically, not chemically, with the components of the algal plastic during compounding.

Flame retardants are chemical compounds that can be physically blended into an algal resin, or can react to become part of the algal plastic. They can be used to treat an algal plastic product so that its resistance to burning is improved or modified. Flame retardants can be chosen so as to interfere with combustion both physically and chemically but not to prevent the algal plastic product from burning when sufficient heat and oxygen are present.

Heat stabilizers can be added to algal resins to prevent thermal degradation, and can be used to extend the usual life of finished products that are exposed to heat. Lubricants, UV stabilizers, and synergistic antioxidants, can frequently be used in conjunction with heat stabilizers.

Impact modifiers/plasticizers can be formulated into algal plastics to improve the resistance of the finished algal plastics product to stress as well as to enhance the appearance and durability of the product and alter characteristics of the algal plastic such as hydrophobicity. These additives are usually elastomeric, although certain types of plastics may also be used. Examples of impact modifiers/plasticizers useful in the present invention include copolymers of acrylic acid, methacrylic acid, crotonic acid, maleic acid, itaconic acid with monomers such as ethylene, vinyl chloride, vinyl esters such as vinyl acetate, vinyl ethers, acrylic acid esters, acrylonitrile, pyrrolidone and other known monomers. Also included are polystyrenes such as methacrylate-acrylonitrile-butadiene-styrene and acrylonitrile-butadiene-styrene; chlorinated polyethylene, polyvinyl alcohols; and ethylene-vinyl acetate. These additives can also accelerate the melting process and improve the rheological and mechanical properties of the melt. Further examples include polyolefines, such as polyethylene, polyisobutylenes, polypropylenes; vinyl polymers such as poly(vinyl chloride), poly(vinyl acetates); polyacrylonitriles; polyacrylates such as polymethacrylates; polyacetals; thermoplastic polycondensates such as polyamides, polyesters, polyurethanes, polycarbonates, poly(alkylene terephthalates); polyarylethers; polyimides; alkylene/vinyl ester-copolymers; ethylene/vinyl alcohol-copolymers; alkylene/acrylates or methacrylate co-polymers; ethylene/ethyl acrylate-copolymers; ethylene/methyl acrylate-copolymers; ABS-copolymers; styrene/acrylonitrile-copolymers; alkylene/maleic anhydride copolymers; acrylamide/acrylonitrile copolymers. Also included are polyvinyl alcohols, polyvinyl acetatephthates, polyvinyl pyrolidone, poly(alkylene oxides), such as poly(ethylene glycols), poly(propylene glycols), poly(ethylene-propylene glycols), polyisobutylenes, lignin acrylamides, lignin 2-hydroxy-ethylmethacrylates, organic plasticizers of low molecular mass, such as glycerol, pentaerythritol, glycerol monoacetate, diacetate, or triacetate, propylene glycol, sorbitol, sodium diethylsulfosuccinate, triethyl citrate and tributyl citrate and other substances which function in like manner.

In addition, the algal plastics can be combined with fillers and extenders such as oxides of magnesium, aluminum, silicon, and titanium, sunflower proteins, soybean proteins, cotton seed proteins, peanut proteins, blood proteins, egg proteins, rape seed proteins and acetylated derivatives thereof, gelatin, cross-linked gelatin, vinylacetate, and acylated proteins. The proteins may be fibrous proteins which increase the dimensional stability of the algal fiber matrix. Other protein fillers are not generally fibrous and thus do not contribute structurally to the resulting algal plastic, and they are primarily added to alter the rigidity or resiliency of the resulting algal plastic.

During the pulping process, between 0 and 85% corn, potato, or other vegetable starch can be added as well as polymerizing adjuvants such as polyvinyl alcohol without losing the flexibility and other qualities contributed by the algal fiber to the final product. The term "starch" as used herein includes such non-modified starches as, for example, carbohydrates of natural, vegetable origin, composed mainly of amylose and/or amylopectin. These starches can be extracted from various plants, examples being potatoes, rice, tapioca, corn, pea, and cereals such as rye, oats and wheat. Starches obtained from high gluten-containing sources, such as "sticky" rice (e.g., sweet rice or Mochigome), can be especially advantageous when used in the present invention, as they contribute structural strength to the resulting algal plastics. The term starch further includes physically modified starches such as gelatinized or cooked starches, starches with a modified acid value, as well as destructurized starches. Further included are starches in which the divalent ions, e.g. $Ca^{2+}$ or $Mg^{2+}$ ions, associated with the phosphate groups have been partially or completely washed out from the starch or alternatively, have been replaced wholly or partially by the same or different mono- or polyvalent ions. Examples of starches useful in the present invention are provided in European Patent Application Publication No. 0,404,727 (Lentz et al.), PCT Application No. PCT/US91/05873 (Cole et al.), U.S. Pat. No. 5,095,054 (Gustav et al.), and U.S. Pat. No. 4,673,438 (Wittwer et al.), all of which are incorporated by reference herein.

Other polysaccharides that contribute their own strength and/or dimensional characteristics to the final product can be added or substituted for starches. These include polysaccharides and modified polysaccharides such as cellulose, methylcellulose, hydroxypropyl cellulose, hydroxyethylcellulose, hydroxypropyl-methylcellulose, hydroxypropylbutylmethyl-cellulose, sodium carboxymethyl-cellulose, polyvinyl-pyrrolidone bentonite, agar, dextran, chitin, polymaltose, polyfructose, pectin, alginates, alginic acid and the like, monosaccharides as glucose, fructose, saccharose and the like, oligosaccharides such as lactose and the like, silicates, carbonates and bicarbonates, gums such as xanthan gum, gum aribil, and guar gum. In addition, natural fibers, such as cotton, flax and wood pulp, can be added to the algal pulp in order to increase strength and dimensional stability.

Strength characteristics can also be enhanced by the addition of amino-group bearing materials such as hexosamines, as for example chitin, as well as materials such as lactic and glycolic acids, their polymers, and mixtures of thereof.

To increase hydrophobicity and dimensional stability while retaining biodegradability, other additions to the foaming formulations can be made. For example, proteinaceous materials such as collagen, gelatin, or curdlan can be added to the formulations.

In some instances, the final algal plastic can be eventually used as feed for livestock or other animals. For instance, foamed packing material, e.g. "peanuts", can be used as feed for cattle, pigs, etc., after its usefulness as a packing agent has expired. In those instances where the ultimate biodegradation is in the gut of an animal, the algal plastic can be nutritionally fortified by adding, for example, proteins, vitamins, minerals, etc. For instance, the addition of casein to the algal plastic can be carried out at the pulping stage, and represents a method for introducing a protein high in essential amino acids into a plastic with the ultimate end goal of providing a feed source for livestock.

For certain applications, for example, food packaging or hot beverage containers, it may be desirable to coat the surfaces of foamed packings with polymeric materials that will confer a waterproof surface, without seriously interfering with their biodegradability. Standard surface coating materials currently in use for paper and/or plastic products can be suitable for coating algal foamed plastics.

Lubricants can be added to algal resins to improve the flow characteristics of the algal plastic during processing. They can function, for instance, by reducing melt viscosity or by reducing adhesion between metallic surfaces of the processing equipment and melted algal plastic. Polarity, melting point, and solubility in the resin are key considerations when a lubricant is selected. Lubricants that reduce molecular friction, thus lowering the algal plastic's melt viscosity and improving its flow, are referred to as internal lubricants. Substances that promote resin flow by reducing friction of the algal plastics melt as it contacts the surface around it are considered external lubricants. Major classes of lubricants include amides, esters, metallic stearates, waxes, and acids. Examples of suitable lubricants include lipids such as glycerides, wax, fatty acids and salts thereof, as well as stearates of aluminum, calcium, magnesium, and tin, magnesium silicate, silicones, and substances which function in like manner. For example, to improve flow properties of the algal plastic resins, lipids such as animal or vegetables fats, especially those which are solid at room temperature, may be used. For instance, fats which have a melting point of greater than 50° C., such as the triglycerides of many $C_{12}$, $C_{14}$, $C_{16}$ and $C_{18}$ fatty acids, can be selected.

Ultraviolet stabilizers can help algal plastics resist light degradation. If absorbed UV radiation is not dissipated, bonds within the polymer can be broken and a free-radical chain reaction can be initiated, which causes discoloration, embrittlement, and eventual premature degradation of the algal plastic. Thus, most algal plastic products designed for outdoor use can be stabilized with additives that either absorb more UV light than the algal plastic itself or deactivate the harmful free radicals and hydroperoxides as they are formed. Benzophenones and benzotriazoles are two widely used commercial products that do act as UV absorbers, and can be compounded with the algal plastics of the present invention.

It may be desirable under some instances to add biocides to the algal plastic to prevent microbial, fungal, and/or algal growth in either the algal plastic pulps and resins or the final algal plastic product. The biocide can be added directly to the pulp or resin before foaming or formation, or can be used in a post-coating process. Examples of biocides useful in the present invention include methylbenzethonium chloride, benzethonium chloride, chlorhexidine gluconate, alkyl dimethyl ammonium chloride, dialkyl methyl benzyl ammonium chloride, and halogenated hydantoins.

The presence of chlorophyll and other pigmentary molecules in the algae can require a bleaching process in those instances where the coloration of the final algal plastic product is of importance. Chemical bleaching of the algal pulp can be carried out using many of the same processes found in the bleaching of wood and nonwood-fiber pulps. The actual bleaching process will depend in part upon the pulping process utilized as well as the desired brightness of the final plastic product. Chlorine dioxide, hypochlorites (such as calcium hypochlorite and sodium hypochlorite), bisulfite, dithionite, peroxides (such as sodium peroxide and hydrogen peroxide), hyperchlorous acid, sodium chlorite, ozone, sodium borohydride, and thioglycolic acid are examples of strongly oxidizing or reducing agents useful in bleaching processes for this invention. The chemical bleaching processes outlined herein are preferably carried out without diminishing or destroying the inherent dimensional stability and structural properties of the algal plastics formed by the process of this invention.

In addition to, or as an alternative to the chemical bleaching steps above, a bleached pre-pulp can be obtained by photo-bleaching. The algae are subjected to conditions which are adverse to photosynthesis and cell-growth so as to cause autolysis of chlorophyll-containing chloroplasts. However, the cell structure and dimensional stability of the resulting algal plastic is not adversely affected by photo-bleaching processes. In the presence of optical energy, the algal mass can then be photo-bleached with a large degree of coloration removed. Depending on the brightness sought for the desired paper product, it may be desirable to carry out both photo-bleaching to form an algal pre-pulp, followed by a chemical bleaching step of the algal pulp. The optical energy used for photo-bleaching can be natural sunlight, or alternatively, artificial light of a wavelength suitable to bring about bleaching of the chlorophyll.

To carry out the in situ bleaching (photo-bleaching) of cladophoraleans for the production of pulps, cladophoralean algae, under prevailing natural or artificially simulated conditions, can be harvested when at least a certain fraction of the harvested population has reached maximum growth and their physiological processes have induced the autolysis of chloroplasts as indicated by the reduction of chlorophyll. The percentage of the population needed to attain this growth state before harvesting can be determined based on the particular strain employed as well as end-product needs. For example, this fraction can range from 30-percent to 70-percent of the harvest population.

Once harvested, the cladophoraleans can be allowed to slowly dry out while exposed to the optical energy necessary for photo-bleaching. Sprinklers can be used to control the drying process by keeping the cladophoraleans moist enough to allow physiological processes such as the degradation of the chloroplasts to be maintained. The need for wetting can be determined by the rate of drying, which can be a function of ambient meteorological conditions and the intensity of the sun. The drying process should progress to the point that the algal mass is fully dry, or until autolysis of the chloroplasts is complete as indicated by the loss of green color. If the photo-bleaching of the algal mass is sufficient, the drying step can be suspended and the moist photo-bleached pre-pulp used directly in the pulping stage if desired. As with bleaching, the drying processes outlined herein may be carried out without adversely affecting the inherent dimensional stability and structural strength of the resulting algal plastics.

In some instances it may be preferable to harvest the algae and mechanically express the water (e.g., by the use of heat, pressure, or combinations thereof) and transport the material to a processing site. At the processing site, the dried algae can then be photo-bleached with artificial or natural light, either before or after mechanical pulping. The key is to harvest the cladophoraleans at the growth stage, or to provide a physiological stimulus to trigger, or make susceptible to autolysis, the chloroplast bodies.

A cellular plastic or plastic foam is defined as a plastic, the apparent density of which is decreased substantially by the presence of numerous cells disposed throughout its mass. While the nomenclature of cellular polymers is not standardized, they are often classified according to the properties of the base polymer, the method of manufacture, the cellular structure, or some combination of these. Cellular plastics or plastic foams consist at a minimum of two phases, a solid phase and a gaseous phase derived from a inherent gases or a blowing agent. The creation of foams requires a system of bubble formation, growth, and stabilization, and usually requires a depressant of surface tension, and chemical means of stabilizing the final product (for example by cross-linking of the polymeric phase), to increase the viscosity of the solid phase, and reduce surface access to the adsorbed phase.

Expanded algal plastics of the present invention can generally be identified as being one of two structural configurations: (a) the closed-cell type, in which each individual cell is completely enclosed by a wall of plastic, or (b) the open-cell type, in which the individual cells are intercommunicating. The algal plastic foams can be rigid, semi-rigid or flexible. In addition to being effected by the composition of the algal plastic, the properties of the end product can also be affected by the type of process used (e.g. casting, extrusion, injection molding).

The type of cellular foams produced depends upon the degree of polymeric rigidity, the foaming agent, and the technique used. In general, there are many well understood techniques in the state of the art for producing cellular plastics that can be used to produce the algal cellular plastics of the present invention.

The following are examples of methods useful for producing cellular algal plastics:

1. Air or other gases are mechanically mixed (whipped) into an algal plastic suspension;
2. Gases dissolved in the algal plastic suspension are vacuum expanded under reduced to pressure;
3. A component of the algal plastic suspension is volatilized by heat;

4. A chemical blowing agent, which produces a gas by a chemical or thermal decomposition reaction, is mixed with the algal plastic suspension;
5. A cross-linking agent which produces gas is mixed with the algal plastic suspension;
6. Soluble crystals or expanded beads or resins are added to the algal plastic suspension.

One method of foaming, "whipping", can be carried out by mechanically separating the algal fibers to expose them and optimize the opportunities for crosslinking of the fibers, and aerating the whipped algal pulp. The fibers may then be allowed to settle before curing the pulp to form the stabilized plastic, or alternatively, the whipped pulp can be stabilized to advantageously retain the aerated structure. If the average fiber length is relatively large, the fibers may pack inefficiently and form a foam upon settling. The choice between allowing the aerated pulp to settle will be at least in part determined by the desired density and the desired strength and dimensional characteristics of the algal plastic.

This process can be accomplished by using the fibers directly or by derivatizing the cellulose. In the first case, the plant may be digested to produce a concentrated mixture of cellulose and hemicellulose fibers. An aqueous solution (such as an alkaline solution) may be used for the digestion process. After the digestion, the fibers can be allowed to settle, resulting in the interlocking and kinking of fibers. The level of foaming can be controlled by factors such as the degree of mechanical whipping, the length of the fibers of the pulp, and the use of surfactants and aerating and whipping agents.

Stabilization of the foam as a cellular plastic can be accomplished as simply as drying the foam. The interlocking of the algal fibers, both mechanically and by hydrogen bonding, can act to give substantial dimension stability to the final foamed plastic. To increase strength and stability of the resulting algal plastic, glues and adhesives can be added to the algal suspension prior to whipping. For instance, the fibers can be coated with a low melting polymer (for example, polyvinyl alcohol), and a crosslinking agent or, alternatively, an adhesive dissolved in a solvent. Fusion occurs with contact between "tacky" fibers and the cellular structure of the foam can be maintained. In some instances, because of surface tension and capillary effects, the coated substance may migrate to the ends of the fiber and produce an anchored network.

Vacuum expansion of algal plastics relies on the expansion of gases or vapors (such as physical blowing agents) present in the algal suspension when a reduced pressure is applied to the pulp. (see for example Gardon et al. (1961) *Textile Research Journal*, 31:160, incorporated by reference herein). For instance, dry ground algal fibers can be mixed with a solvent, surfactant, and foam stabilizer, and the mixture thoroughly mixed and placed in a molding die. Pressure is applied on the die while it is heated (i.e. to about 150° C.) by application of steam heat. After a predetermined time, the pressure is released and the mixture allowed to expand.

The volatilization of a component of the algal pulp can also be used to form a cellular foamed plastic. For instance, the use of heat, either generated by an exothermic reaction between components of the pulp or externally applied to the system, can be used to volatilize a component of the pulp. The expansion of the volatilized component causes the formation of a foam. For instance, the volatile component can be water that is present in the pulp. The steam can act to expand the pulp and form a cellular plastic. In one aspect of the invention, a foamed plastic "starter" material can be generated by heating a dry ground or wet pulped algal resin to about 95° C. or until the starch or pectinaceous components of the algal fiber have reached an amorphous, gel-like state. The cellulose fibrils are thus surrounded by the amorphous material, and the material is dried to a predetermined humidity. The dried material, which can be in the form of pellets, can then be subsequently steam exploded using extruders or microwave puffers which heat the remaining water in the pellets, forming steam and "popping" the pellets. In another aspect of the invention, the algal fibers can be optionally mixed with other additives (e.g. starch, water) and directly foamed by microwave or heat extrusion (e.g. via a screw extruder).

Physical and chemical blowing agents, as discussed below, can be used to make foamed algal plastics. Physical blowing agents are volatile liquids or compressed gasses that, because of changes they undergo during processing of the plastic, give the plastic a cellular structure. Gasses, such as nitrogen, carbon dioxide, and air, or low-boiling liquids, such as short-chain hydrocarbons, are dissolved in the algal plastic resin and can be volatilized by the release of pressure or the heat of processing. Chemical blowing agents are solids or liquids that generate gasses when decomposed by the heat of processing, generating a foamed algal plastic product. Chemical blowing agents can be designed to decompose within well-defined temperature ranges that can be lowered by the addition of activating compounds.

Blowing agents are compounding ingredients in the algal plastic which also allow the formation of expanded (cellular) algal plastics. The most convenient way of expanding algal plastics using blowing agents is to incorporate into the resin a compound that generates a gas upon thermal decomposition or as the result of a chemical reaction. Blowing agents useful in the present invention include both organic and inorganic blowing agents. Organic blowing agents will generally be desired when the foamed algal plastic is to have a closed-cell structure. In contrast to "soda" (sodium bicarbonate) and other inorganic blowing agents, organic blowing agents are often better suited for producing fine, closed cell structures.

Generally, organic blowing agents are organic compounds that are stable at normal storage and mixing temperatures, but undergo controllable gas evolution at reasonably well-defined decomposition temperatures. The organic blowing agents that are available vary widely in their properties. Importantly, they vary in the temperature at which they produce gas, and in the nature of their decomposition products. The agents may also vary in their response to other material present in the expandable algal plastic which may function as activators or retarders. Blowing agents which release nitrogen are most preferred, as nitrogen is an inert, odorless, nontoxic gas. However, other gas-producing blowing agents can be used to produce, for instance, carbon dioxide or oxygen. Examples of blowing agents useful in the present invention include Azodicarbonamide, Dinitropentamethylene tetramine, Benzene Sulfonyl Hydrazide, p-Toluene Sulfonyl Hydrazide, p,p-Oxybis(Benzene Sulfonyl Hydrazide), 5-phenyl Tetrazole, and sulfonyl semicarbazides. It is well known that conditions such as moisture and the chemical composition of the plastic can effect the decomposition temperature of a blowing agent. Further, decomposition temperatures can be adjusted up or down using a variety of activators or retarders.

The processes described above are most suitable for algal pulps having average fiber lengths that are long. When the algal fibers are short, however, a crosslinking technique can yield better results for forming the cellular plastics. A cross-linking agent and a solvent may be needed for the foaming. Potential cross-linking agents include diisocyanate, Glutaraldehyde, melamine formaldehyde and urea formaldehyde. During the foaming process, metered amounts of crosslinking agent can be fed into a reaction chamber containing the fiber and the solvent. The mixture can then have heat and/or vacuum applied to vaporize the solvent and yield a foamed structure. Appropriate amounts of foam stabilizers such as $Na_2SiF_6$ and Si and Al compounds can be useful to stabilize the cell structure of the algal plastics.

With particular regard to the use of isocyanates as cross-linking agents, the algal plastics of the present invention can be made using isocyanate-based techniques, which are similar or analogous to polyurethane foaming methods. Polyurethane foams are prepared by reacting hydroxyl-containing compounds (polyols) with an isocyanate. The polysaccharides of the algae can serve as a source of hydroxyl-containing fibers for cross-linking and incorporated into isocyanate-based and -generated foams in several forms: (a) unmodified, (b) derivatized, (c) depolymerized and derivatized, and (d) converted to non-carbohydrate polyol. The latter chemical modification can be carried out concurrently with or subsequent to a pulping step. Additionally, other polyols can be added to the pulp, such as polyether polyol. Toluene diisocyanate (TDI), diphenylmethane diisocyanate (MDI) and polymethylene polyphenyl isocyanate (PAPI) are examples of isocyanates useful in urethane-like (isocyanate-based) reactions to form the algal plastics.

In the production of isocyanate-based foams, two reactions occur. The first is a reaction of the isocyanate with the hydroxyl groups of the polysaccharides of the algal pulps to create inter-chain linkages. The second reaction, which generates the blowing gas and produces the expanded foam structure, may be chemical or physical in nature. In the chemical reaction, the polymeric structure of the foam is formed by the reaction of the isocyanate with the polysaccharides. Simultaneously, the isocyanate reacts with water contained in the reaction mixture to form an intermediate product, carbamic acid, which decomposes to give off carbon dioxide as a blowing gas to expand the matrix. The physical reaction involves the volatilization of a blowing agent (e.g., an inert, low boiling chemical) to provide expansion. A blowing agent can be added to the formulation and the foamed structure formed by volatilization of the blowing agent under the exothermic heat produced by the polysaccharide-isocyanate reaction.

Foamed algal plastics can also be formed by the addition of soluble crystals or expanded beads or resins to an algal pulp. For instance, the cellulose can be derivatized in an alkaline (NaOH) solution, and $Na_2SO_4$ crystals added to the thick suspension that forms. These crystals can become suspended and entrapped in the thick slurry of the pulped fibers. At this point, $H_2SO_4$ can be added to precipitate the cellulose structure. The $Na_2SO_4$ crystals suspended in the cellulose can then be washed away with water to yield a semiporous open cell algal foam structure. The size of the algal foam cell may be controlled by controlling the size of the crystal.

If dissolution of the cellulose is not desirable, a pulp of the material can be made. The $Na_2SO_4$ crystals can be added to this pulp. The fibers may settle in a viscous liquid and produce mechanical interlocking, as indicated before, which provides structural strength and dimensional stability. The $Na_2SO_4$ crystals can then be washed away with water to yield the foam structure. A surfactant and a foam stabilizer may be used to enhance the foam structure. Other crystals may also be used instead of $Na_2SO_4$.

In yet further embodiments, non-foamed solid plastics are useful for applications requiring greater dimensional stability than might be provided by a foamed cellular plastic. In such instances, the algal plastic can be formed utilizing plastic forming techniques which are known in the art and which are suitable for either a thermoplastic or a thermosetting algal fiber matrix. Such plastic forming processes can include, for example, molding, extrusion, calendering, casting and thermoforming processes. Solid algal plastics derived from such plastic forming processes can include, for example, biodegradable golf tees, biodegradable plastic bags, and the like.

The term "thermoplastic", as used herein, refers to polymers that are solid at room temperature but soften or melt when the temperature is sufficiently high. The term "thermosetting", as used herein, refers to plastic materials which undergo a chemical crosslinking reaction when the temperature is raised. Thermosetting materials harden and become rigid at elevated temperatures in an irreversible chemical reaction, whereas thermoplastic materials can be processed and reprocessed by repeated applications of heat.

Molding processes can include, for example, blow molding, injection molding, compression molding, transfer molding, and rotational molding processes. Blow molding involves the molding of hollow objects in which air or a gas, such as nitrogen, is blown into a hot thermosetting or thermoplastic preform to expand it against a female mold cavity. The thermosetting or thermoplastic preform material can include the algal fiber matrix of the present invention. Blow molding is particularly suitable for the production of, for example, bottles, containers, and boxes and has also been used successfully to produce structural shapes, including toys, wheels, trays, tanks, cases, and the like.

In injection molding, a thermosetting or thermoplastic material, which can include the algal fiber matrix of the present invention, is heated until it flows under pressure. The hot plastic is then injected into a closed mold and allowed to cool in the mold. Once the material has cooled, the mold is then opened and the hardened plastic piece is ejected. Any thermoplastic material which is lost to scrap can be reground and reused. The molded parts need little or no finishing, and close tolerances are generally maintained. Injection molding is particularly suitable for producing large numbers of small parts at high production rates, such as, for example, toys, bottle caps, combs, disposable cups and containers, and the like.

Compression molding and transfer molding are similar processes for producing molded parts from thermosetting plastic materials. In the basic process, the plastic material, which can include the algal fiber matrix of the present invention, is heated sufficiently to soften it while being subjected to substantial pressures (up to 4000 psi) for a sufficient time to polymerize or cross-link the plastic material, thereby rendering it hard and rigid. The molded part is then removed from the mold cavity. Compression molding employs an open mold cavity into which the plastic material is placed prior to the application of heat and pressure. Transfer molding employs a closed mold cavity into which the plastic material is introduced in its plastic state through a small entry orifice. Transfer molding is particularly suitable for the manufacture of delicate parts, parts with thick sections (i.e., greater than ⅛ inch), or parts which are to be molded with or around an insert (such as, for example, electronic components).

Rotational molding is an economical and efficient technique for producing hollow plastic parts from thermoplastic and thermosetting materials. It involves the use of heated, biaxially rotating molds, into which a liquid or powdered plastic material is charged. The plastic material can include the algal fiber matrix of the present invention. During the heating cycle the plastic material melts and fuses; during the rotation period, the melted and fused material densifies into the mold shape. The mold is then slowly cooled to maintain the dimensional stability of the formed part. The cooled part is then removed from the mold.

Extrusion involves the forcing of a material through an opening and can be performed with either thermoplastic or thermosetting materials. The plastic material can include the algal fiber matrix of the present invention. A molten thermoplastic material can flow through an extruder to adopt the shape of an die or a mold. A thermosetting material can also be extruded, provided the extrusion is carried out before the crosslinking reaction occurs. Obviously, good temperature control is essential in processing thermosetting materials. Extruders are typically used to produce plastic materials having a constant cross-section, such as tubes, sheets and other uniform-thickness parts.

Extruders typically employ at least one Archimedean screw which rotates in a stationary extrusion barrel. A die which shapes the extruded product is installed at the outlet end of the extrusion barrel. The screw can advance axially as well as rotationally to provide a cyclical operation; such machines are called reciprocating screw extruders and are widely used in injection molding processes. Extruders are extremely versatile machines, as they can perform numerous functions, including the conveyance, heating, melting, forming, shaping, mixing and devolatilization of solid and melted materials.

Disk, or screwless, extruders use a disk instead of a rotating screw to induce transport of the material through the extruder. Ram extruders employ a positive displacement plunger device which operates intermittently and generates extremely high pressures. Ram extruders work particularly well in combination with injection molding and blow molding equipment.

Calendering is the extrusion of a mass of material between successive pairs of co-rotating, parallel rollers to form a thin film or sheet. Textiles, paper and nonwoven fabrics can include the algal fiber matrix of the present invention and can be produced by rolling sheet calendering, wherein a preformed web is passed through the rollers to improve its appearance and properties. Thermoplastics and rubber which include the algal fiber matrix of the present invention can also be processed by viscous bank calendering, wherein the sheet is directly formed and surfaced within the calender. Floor tiles incorporating the algal fiber matrix of the present invention can also be produced in a specialized calender, in which a plastic or rubber sheet is laminated, or affixed under heat and pressure, to a substrate.

Casting involves the combination of a liquid resin, which can include the algal fiber matrix of the present invention, and a catalyst. The mixture is then poured into a mold having the desired shape. The mixture begins to gel, or lose its fluidity, as long polymer chains begin to form. The reaction is exothermic until the crosslinking is complete and the material has hardened into a permanent configuration of the mold cavity. Casting is particularly suitable for forming complex, intricate shapes, or for enclosing and protecting a delicate object, such as electronic components. The liquid resin can include thermosetting materials, such as epoxies, polyesters, silicones and polyurethanes, and elastomers, including rubbers, flexible urethanes, polysulfides and flexible silicones.

Casting processes can include, for example, gel casting, potting and encapsulation. The gel casting process involves the dissolution of a polymer in an appropriate solvent, and evaporation of the solvent to leave behind a solid polymer, or gel. The gel can be converted to a microporous material by immersing the gel in a non-solvent, such as methanol. Microporous gel cast materials are currently being used as bone graft substitutes. The attraction of using these biodegradable, biocompatible synthetic polymers is that the resorption rate can be varied by copolymerization, control of molecular weight, and crystallinity. The microporosity facilitates infiltration of fluids and tissue ingrowth which is expected to enhance material degradation by hydrolytic chain scission and mechanical fragmentation.

Gelation is a phenomenon encountered with crystalline polymers. The polymeric chains form association complexes at widely separated points. This leads to formation of a continuous physical network structure extending throughout the volume of the system. The association produces quasi— crosslinkages and is a reversible process, so that the gel may be liquefied and reset many times.

The general procedure for gel casting basically comprises of the following steps: polymer dissolution in tetrahydrofuran (THF); casting the solution in a mold; gel formation in situ; removal of shaped gel from mold; and solvent removal and drying. Formation of a distinct gel phase enables production of thick, solid moldings.

Thermoforming is a method of processing plastic resin into finished parts from sheets (greater than 0.010 inch thick) or films (less than 0.010 inch thick). The plastic sheet or film is heated to a suitable forming temperature and is immediately shaped to the desired configuration. During processing the sheet or film is quite pliable and flexible, so that forming can be accomplished with a minimum of force and energy. Pressure is maintained until the part has cooled, after which the part is then trimmed. The sheet or film is typically produced by extruding a thermosetting or thermoplastic material, which can include the algal fiber matrix of the present invention.

In yet another embodiment of the present invention, the algal fiber matrix can be incorporated into cements, such as are used in the manufacture of concrete. The high water-absorbing and water-retaining capability of the algal fiber matrix enhance the compressive strength properties of the cement. The algal fiber matrix of the present invention can contain up to 30% water within the microfibrillar structure of the matrix; further, it releases its water content very slowly. This property can be used advantageously in the manufacture of cements and concretes having substantially increased strength without increased filler volume and weight.

The following non-limiting examples are presented.

EXAMPLE 1

Algal plastic resins can be produced from filamentous green cladophoralean algae by dry-grinding the algae to uniform granulation. To produce a satisfactory resin, 5 gms of previous air-dried *C. glomerata* Kuetzing was placed in a Waring laboratory blender and stirred, optimally for 5 seconds, at the slowest possible speed, to produce a loose, non-agglomerated fibrous resin. When observed by eye or with the scanning electron microscope, no obvious damage to the fiber was observed except for shearing.

EXAMPLE 2

Algal plastic foams were generated using isocyanate and the addition of polyol to a filamentous green algal pulp. This technique relies on the isocyanate base techniques described above to develop a foam from the reaction of the hydroxyl groups of the algal fibers and the polyol, with an isocyanate. The algal resin was reacted with a polyether polyol and an isocyanate mixture (MONDUR MR (LIGHT) (4.4'-diphenylmethane diisocyanate; diphenylmethane diisocyanate, and higher oligomers of MDI) to produce cross-linking and thereby obtain a rigid, foamed algal structure. A blowing agent (pentane) was used to produce the foam and a catalyst (dimethyl ethanolamine) was added to accelerate the reaction.

Appropriate amounts of the raw material were mixed together at room-temperature in a container or appropriate mold. For example, to produce an algal urethane foam comprising approximately 40-percent (v/v) algae, 28% polyol, 40% ground dried filamentous green algae (*C. glomerata* Kuetzing), 4% catalyst, 5% pentane and 23% isocyanate, all expressed in vol/vol percentage, were mixed together. After mixing, the algal pulp began to rise and produced a foamed structure. The rate of foaming was adjusted by controlling the amount of catalyst. In this example, typical foaming times were controlled to be on the order of about 3 to 15 minutes. The percentage of algae used in a particular reaction can be adjusted to suit the particular application needs. As described above, to produce an algal urethane foam comprising approximately 70-percent (v/v) algae, 16% polyol, 66-70% ground dried algae, 2% catalyst, 3% pentane and 13% isocyanate were used in the foaming reaction. Importantly, when the foaming reaction was carried out in the absence of algal fibers, no plastic foam was generated.

The algal foams produced by this technique were quite rigid, and resilient, and highly resistant to impact. Their qualities appeared to be similar to that of polystyrene packing foams. Algal foams produced by this procedure have measured compression profiles (e.g. compressive strength and compression modulus) that are within the range expected for polystyrene foams. The rigidity or resiliency of the final foamed product can be influenced by the percentage of algal material used, as well as the percentage of other additives utilized, such as the amount of polyol, isocyanate, etc. Typical densities were estimated to be on the order of 0.08 to 0.15 g/cm$^3$. Furthermore, it was noted that the amount of polyol used can effect the compressibility of the foamed material and that a higher amounts of polyol (e.g. greater than about 35-percent v/v), the foamed material exhibits soft foam characteristics. Also, when the blowing agent is increased, the amount of porosity in the algal foam increases. At very high additions of blowing agents, the pore size also increases and the algal foam becomes very brittle.

To achieve successful foaming it may be necessary to determine the hydroxyl number of the algal pulp, and to know accurately the hydroxyl number of the polyol used. Techniques for measuring the hydroxyl number are well known in the art.

The isocyanate based foaming method described above was also utilized in reaction injection molding processes. For instance, metered quantities of the reactants were added to a polyethylene mold and allowed to undergo reaction (foaming) in the mold. The resultant molded algal plastics were similar in attributes to those foams produced outside of closed molds. Lubricants were also used in the injection molding, including the use of fatty acids, to aid in the release of the molded algal plastic from the mold.

EXAMPLE 3

Algal plastics were formed by foaming methods using isocyanate and wet-pulped algal resins. Foams similar to the foams described in Example 2 were produced with wet-pulp algal resins, in which the number of available hydroxyl groups was significant increased. In such pulps the ratio of algal pulp to polyols increased proportionately to the number of exposed hydroxyl groups, with a consequent increase in the extent of fibrillar crosslinking.

It is also possible to replace synthetic polyols with starch. Initial experiments have been conducted, for instance, with corn starch and "sticky" rice starch. We have replaced a major portion of the polyol with uncrosslinked starch. For example, 35 g of starch was added to 80 g of water and heated to 95° C. to its gel-like condition. This starch gel was used to replace at least a portion of the polyols in the reactions described in Example 2. Under these conditions rigid algal foams were produced.

EXAMPLE 4

Several foaming techniques have been utilized that serve to eliminate isocyanate and replace it with more biocompatible products. In this example, dry pulped filamentous green algae (*C. glomerata* Kuetzing) were mixed with glycolic acid, a pentane blowing agent, and in some instances, with a small quantity of a foam stabilizer (e.g. diphenyl guanidine). The mixture was then allowed to foam under vacuum. When the vacuum was applied, the mixture began to rise rapidly and remained stable. The foams produced by this process contained only algae and glycolic acid, which are both biodegradable.

EXAMPLE 5

Microwave popped algal foams were produced by a number of methods. For instance, a mixture of 4 g filamentous green algal powder (approx. 60% v/v), 33 g starch, and 4 g baking soda was mixed with 80 mls water and allowed to stand for 15–20 minutes at room temperature. The mixture was then microwaved for 1 minute in a 600 watt microwave at a setting of high.

In some instances, small quantities of a foam stabilizer, such as diphenyl guanidine, was added to the algal resin prior to foaming.

EXAMPLE 6

The effects of adding impact modifiers/plastizers to the present algal plastics was also assessed. For instance, polyvinyl alcohol (PVA) can be used as a plasticizer for enhancing the flow properties in extrusion and injection molding with the algal plastics. PVA was added to the microwave composition in different percentages and it's effect on weight loss and hardness properties was studied. Two types of PVA were used: High Viscosity PVA (45,000–50,000 centipoise/second), and PVA (Mol. wt. 13,000–23,000). The compositions used were as follows:

TABLE I

| High Viscosity PVA (45,000–50,000 centipoise/second) | | | |
|---|---|---|---|
| Mochigome Rice Starch, grams | Algae, grams | PVA, grams | Water, ml |
| 8 | 2.4 | 0.0 | 20 |
| 8 | 2.4 | 1.6 | 20 |
| 8 | 2.4 | 3.4 | 20 |
| 8 | 2.4 | 5.4 | 20 |

TABLE II

| PVA (mol. wt. 13,000–23,000) | | | |
|---|---|---|---|
| Mochigome Rice Starch, grams | Algae, grams | PVA, grams | Water, ml |
| 8 | 2.4 | 1.6 | 20 |
| 8 | 2.4 | 3.4 | 20 |
| 8 | 2.4 | 5.4 | 20 |

Following a protocol similar to Example 5, the algal plastic foams were formed by microwave puffing, and the rsulting plastics analyzed. The results of hardness testing and weight loss analysis were as follows:

TABLE IV

| grams PVA (high viscosity or PVA) | Foaming | % weight loss | Hardness ASTM D 2240 D scale |
|---|---|---|---|
| 1.6 g PVA (High Viscosity) | Good | 66% | 66.0 ± 10.6 |
| 3.4 g PVA (High Viscosity) | Good | 59% | 79.0 ± 5.0 |
| 5.4 g PVA (High Viscosity) | Good | 59% | 85.3 ± 7.5 |
| 1.6 g PVA (Low Mol Wt) | Good | 62% | 92.3 ± 4.6 |
| 3.4 g PVA (Low Mol Wt) | Good | 64% | 83.0 ± 9.5 |
| 5.4 g PVA (Low Mol Wt) | Good | 64% | 81.3 ± 8.0 |

EXAMPLE 7

Likewise, the effects of adding polyethylene glycol (PEG, mol. wt. 100,000) on the hardness of the agal plastic was studied. The foaming properties were good, but hardness of the samples increased significantly. The compositions used were as follows:

TABLE V

| Mochigome Rice Starch, grams | Algae, grams | PEG, grams | Water, ml |
|---|---|---|---|
| 8 | 2.4 | 1.6 | 20 |
| 8 | 2.4 | 3.4 | 20 |
| 8 | 2.4 | 5.4 | 20 |

Following a protocol similar to Examples 5 and 6, the algal plastic foams were formed by microwave puffing, and the rsulting plastics analyzed. The results of hardness testing and weight loss analysis were as follows:

TABLE VI

| PEG, grams | Foaming | % weight loss | Hardness ASTM D 2240 D Scale |
|---|---|---|---|
| 0 | Good | 66% | 66.0 ± 5.0 |
| 1.6 | Good | 59% | 82.6 ± 11.4 |
| 3.4 | Good | 58% | 85.0 ± 8.3 |
| 5.4 | Good | 57% | 86.0 ± 9.6 |

EXAMPLE 8

Algal foams have been produced by the use of screw extruders. For instance, an algal resin mixture (e.g. in the range of 40–80% algae v/v) including a blowing agent was added to the hopper of the injection molder. The screw extruder, at 50 mPa and a temperature of 100°–150° C., had a plasticizing effect on the algal resin. The screw drive pushed the resin mass into a mold under the above pressure. The pressure was then released and the mold removed from the unit and the molded algal plastic extracted from the mold.

Alternatively, when water is used as the blowing agent, the algal resin mixture can be extruded in the form of a rod or pellets and then subsequently foamed by application of heat sufficient to vaporize the residual water and "pop" the pellet or rod. For example, the extruded algal resin mass was cut into pellets and the pellets heated in a 600 watt microwave and puffed by the vaporization of the residual water in the pellet. Expansion of the extruded resin to the foamed algal plastic pellets (i.e. peanuts) can consist of, for example, a change in volume on the order of 300–400 percent. The amount of foaming could be controlled by varying the water content of the pellets before the microwave expansion. Additionally, the pellets could be fed into the hopper of an extruder and puffed by the heat applied to the pellets and the foamed plastic extruded in the form of peanuts or as a molded plastic.

EXAMPLE 9

The effects of plastizers in the injection molding techniques, such as in Example 8, were also determined. For example, polypropylene was added to an algal pulp (produced by dry grinding), and the resin fed directly into the hopper of an injection molding machine (Screw Arburg 220E-150M/c) operating in the range of 165° to 170° C. and 800 psi (injection cylinder pressure). The tensile module of the resulting algal plastics were found to increase with increasing algal fiber content.

EXAMPLE 10

The use of injection molding techniques for algal foamed packings is highly desirable. For example, gas injection molding processes have been used successfully for foaming resins containing long fibers embedded in amorphous matrices.

Experiments were conducted to determine whether the algal pulps would be thermally and dimensionally stable under the high temperature necessary for injection molding, and to generate appropriate parameters for injection molding. Samples of filamentous green algae were subjected to temperatures of up to 400° C. The effects of heat on the algae were analyzed by thermogravimetric analysis. The results indicate that when the algae was heated, the first weight loss occurred at about 58° C. This weight loss peaked at 63° C. and ends at 82° C. At this point the total weight loss was about 5%. As the algae was heated further, there was no major weight loss until 222° C. This reaction peaked at 254° C. and ended at 272° C. At this temperature, the total weight loss was about 15%. As the algae was heated further, there was gradual weight loss and at 400° C., the total weight loss was measured to be 55%.

EXAMPLE 11

High impact Polystyrene (HIPS) resin (commercial grade) was used as supplied (pellets). Algae fibers were ground for 180 seconds Algae fibers and HIPS pellets were hand mixed in various percentages (0, 1, 2, 5, 9 wt % algae) and directly fed in the hopper. The nozzle setting was at 90 % and the temperatures in the front and rear zone were 170° and 165° C., respectively. The thrust ring was not removed. The screw speed was 190 rpm for most compositions except for 5 and 9 wt % algae compositions where the speed was 200 rpm. The cylinder injection pressure was 5.4 MPa.

The tensile samples were tested according to ASTM D-638 at a strain rate of 50.8 mm per minute. A minimum of 5 samples were used. A JEOL 840 scanning electron microscope was used to study the fracture surface in the tensile tested samples. The surface was coated with Au—Pd.

The average range of fiber length distribution was 0.5–1.0 mm. Up to 9 weight percent of algae fiber was incorporated into HIPS during injection molding. Uniform dispersion was observed upto 5 wt % algae. However the clumping of fibers was observed in 9 wt. % algae samples. A temperature range between 165°–170° C. was used for all compositions. The use of compounding equipment may possibly enable the manufacture of composites with high fiber content. The weight of the samples was observed to increase slightly with fiber content. This may be due to better packing in the mold.

The injection molded samples were tested according to the ASTM D 638 for tensile strength. At least five samples were tested for each datum. The values for tensile strength, modulus and elongation are listed in Table VII. The tensile strength of the samples were observed to decrease with increase in algae content. However, an increase in modulus was observed. Large variation in modulus values was observed which may be expected. The tensile elongation increased upto 2 wt. % algae and then decreased with further addition.

TABLE VII

Tensile properties in Algae - HIPS injection molded composites

| Wt % algae | Tensile Strength, MPa | Tensile Modulus, MPa | % tensile elongation | Density, g/cm³ |
|---|---|---|---|---|
| 0.0 | 45.6 ± 1.6 | 1638 ± 46 | 10.9 ± 1.5 | 8.60 ± 0.27 |
| 1.0 | 42.8 ± 0.4 | 1667 ± 71 | 13.5 ± 1.4 | 8.96 ± 0.02 |
| 2.0 | 42.7 ± 0.5 | 1756 ± 91 | 13.4 ± 1.9 | 8.96 ± 0.01 |
| 5.0 | 41.0 ± 0.8 | 1718 ± 106 | 10.3 ± 1.6 | 9.00 ± 0.04 |
| 9.0 | 40.8 ± 1.1 | 1772 ± 0 | 8.9 ± 0.9 | 9.10 ± 0.02 |

In algae—HIPS samples, tensile strength was observed to decrease with addition of algae fibers; however, the tensile modulus showed an increase. This results are consistent with tensile results obtained in most filled composites. The decrease in tensile strength may be due to lack of adhesion between the fiber and polymer.

The fracture surfaces of the samples after tensile testing were investigated under a scanning electron microscope. The clean fracture surface did not show any algae fibers on the surface. The other side of fracture showed stress whitening around the algae fibers. This may be due to the lack of adhesion between fibers and the polymer matrix which resulted in fiber pull and a lower tensile strength. Shear lips (S) and high extensibility of HIPS indicated ductile failure which is commonly seen in HIPS. The lack of adhesion between the fibers and the polymer matrix may be the cause of decrease in strength with addition of algae.

EXAMPLE 12

Three types of native starches were used in powder form : 1) Glutenous Rice, 2) Corn, 50% Amylose content, and 3) Corn, 70% Amylose content. Algae was ground for 180 sec. The suppliers and material specifications are given in Table VIII. The composition used for injection molding was used as follows:

| Starch | 57 weight % (500 g) |
|---|---|
| Water | 34 weight % (300 ml) |
| Algae | 6 weight % (55 g) |
| Glycerol | 3 weight % (32 g) |

Injection molding trials were run on a 28 ton Arburg toggle clamp vertical injection molding machine (Arburg 220 E-150). The machine contained a 22 mm screw. Throughout the molding trials the cycle time was 45 seconds, with 13 sec for injection and 7 sec for mold opening. During plasticization the screw speed was 200 rpm. Due to initial feeding problems, the thrust ring on the screw was removed and there was no back pressure. The nozzle setting was at 58%. The temperatures in the front and rear heater zones were different for the three starches (Table IX).

TABLE VIII

Specifications of native Starches used in Injection molding

| Starch | Supplier | Product Name | Specifications |
|---|---|---|---|
| Glutinous Rice | Erawan Marketing Co., Bangkok, Thailand | Glutinous Rice | 17% amylose |
| Corn (50% amylose) | American Maize, Hammond, Indiana | Amaizo 5 | 50% amylose |
| Corn (70% amylose) | American Maize | Amylomaize VII | 70% amylose |

TABLE IX

Process variables in injection molding of algae - unmodified starch composites

| Process variables | Glutenous Rice (17% Amylose)² | Corn Starch (50% Amylose) | Corn Starch (70% Amylose) |
|---|---|---|---|
| Front Heater, °C. | 140 | 150 | 155 |
| Rear Heater, °C. | 130 | 135 | 145 |

The injection cylinder pressure was 6.8 MPa The mold in the machine produced one ASTM D-638 Type I tensile sample per cycle. The gate location was at the top of the sample. The tensile bars were 3.2 mm thick and the neck width was 13 mm. Tensile properties were measured using an Instron machine. A strain rate of 50.8 mm per minute was used. A minimum of three samples were used in each case. Hardness was measured using a Rex durometer according to ASTM D 2240 standards.

The average range of fiber length distribution was 0.5–1.0 mm. It was observed that higher barrel temperature was required for starches with higher amylose content. Flow properties decreased with increase in amylose content.

The algae—rice starch samples retained moisture after molding and did not form rigid molded samples. Upto 34% weight loss was observed in the samples. The weight loss was calculated by drying the samples in a microwave oven and observing the change in weight. Results are listed in Table X. The weight loss in molded samples resulted in distortion and embrittlement. The samples did not show good strength properties.

TABLE X

Weight loss in molded algae - rice starch samples

| Time period after molding | % weight loss |
|---|---|
| Immediate | 34% |
| After 3 days | 19% |
| After 5 days | 11% |
| After 15 days | 5% |
| After 20 days | <1% |

The algae—corn starch samples showed higher strength as compared to rice starch samples. The tensile strength and hardness in 70% amylose content samples were higher. The tensile strength of the algae-corn starch samples was in the range of 18-21 MPa (Table XI). The percent elongation at break was only 1%. The samples were soft with the hardness value in the range of 72-79 A scale Shore hardness.

TABLE XI

Mechanical properties of algae - corn starch molded composites

| Test Methods | Corn Starch 50% Amylose | Corn Starch 70% Amylose |
|---|---|---|
| Hardness, A scale, (immediately after molding) | 72 ± 2 | 79 ± 1 |
| Tensile Strength, MPa, (10 days after molding) | 18.0 ± 0.5 | 21.0 ± 0.4 |
| % elongation at failure | 0.8% | 1.0% |

Since amylose is a linear polymer while amylopectin is a crystalline polymer, it may be expected that the strength increases with amylopectin content. However, this was not observed. The properties in injection molded algae—native starches were observed to increase with increase in amylose content. The corn starch samples also showed moisture loss (10 wt %) and eventual embrittlement after 30 days of storage.

EXAMPLE 13

Novon resin was supplied by Novon Products group, Warner Lambert Company, Morris Plains, N.J. Novon is a specially modified starch resin with improved processing properties. Algae fibers and Novon resin were mixed in different compositions (0, 1, 5 wt. algae %) and injection molded at barrel injection pressure of 5.4 MPa. The nozzle setting was at 90%. The front and rear zone temperatures had to be changed with the addition of algae. The front and rear temperatures for 0 wt % algae were 175° C. The front and rear zone temperatures for composition with algae were 180° and 175° C., respectively. After 20 samples the temperature had to be lowered to 160° C. in each case. The screw speed was 205 rpm for 0 wt % algae which increased to 210 rpm with addition of algae. The samples were tested for tensile samples. A minimum of 4 samples were tested for each datum. Fibers were separated for examination. The distribution was determined by projecting the images of the fibers on a large screen and measuring length. Approximately 100 fibers were measured.

The average range of fiber length distribution was 0.5-1.0 mm. Up to 5 weight % of fiber was incorporated in Novon resin. The fibers were observed to cling together in bundles and resist dispersion unlike algae-HIPS samples. This may be due to the large pellet size of Novon (twice that of HIPS pellets). Higher density of Novon (1.26 g/cm$^3$) may also account for poor dispersion of algae in Novon. The density and tensile properties showed different trends in comparison to algae-HIPS samples. The weight of the injection molded samples did not show an increase with addition of algae (Table XII).

The tensile properties of the Novon-algae samples are also given in Table XII. The tensile strength did not change substantially even with addition of 5 wt. % algae. This may be due to good adhesion between algae and polymer which may be expected due to similar chemical structures. The tensile properties did not decrease with addition of 5 wt. % algae.

TABLE XII

Tensile properties of Novon - algae composites

| Wt. % algae | Tensile Strength, MPa | Tensile Modulus, GPa | Elongation at fail, % | Density g/cm$^3$ |
|---|---|---|---|---|
| 0 wt. % algae | 41.2 ± 2.5 | 3.7 ± 1.0 | 1.9 ± 0.2 | 1.25 ± 0.0 |
| 1 wt. % algae | 41.1 ± 0.8 | 3.0 ± 0.6 | 2.0 ± 0.0 | 1.24 ± 0.2 |
| 5 wt. % algae | 42.0 ± 1.6 | 5.1 ± 3.8 | 2.0 ± 0.0 | 1.24 ± 0.2 |

Typical tensile curves for HIPS-algae and Novon-algae composites showed yield point, a characteristic of amorphous ductile materials. Novon samples did not show yield indicative of brittle failure. A comparison of mechanical properties in various reinforced/filled composites is listed in Table XIII. The properties of algae composites are comparable to the commercial composites.

TABLE XIII

Properties of various reinforced composites

| Composite | Filler Content | Tensile Strength, MPa | Tensile Modulus, GPa | Tensile % elongation |
|---|---|---|---|---|
| HIPS - glass[68] | 20-35 | 68-102 | 5.7-8.2 | 1.0-1.4 |
| HIPS - Talc[69] | 40 | 37.4 | — | 1.6 8-10 |
| HIPS - algae | 9 | 40-42 | 1.8 | 2.0 |
| Novon - algae | 5 | 40-43 | 1.3-8.9 | |

EXAMPLE 14

Polycaprolactone (PCL) gel cast materials were prepared without and with algae, using the materials shown in Table XIV. High (80,000) and low (43,000) molecular weight grades were used.

TABLE XIV

Materials used and their suppliers

| Material | Trade Name | Supplier |
|---|---|---|
| Low mol. wt. PCL | P-767 (Tone polymer) | Union Carbide, Danbury, CT |
| High mol. wt. PCL | P-787 (Tone polymer) | Union Carbide, Danbury, CT |
| Tetrahydrofuran (THF) | Reagent grade | Aldrich Chemical Co. Milwaukee, WI |
| Methanol | Reagent grade | Aldrich Chemical Co. Milwaukee, WI | a) Sample preparation of Polycaprolactone (PCL) gel cast materials (without algae)

PCL was used as supplied in the form of pellets. A 25% (w/v) solution was produced by dissolving 5 g of PCL in 20 ml of THF in a 80 ml beaker. The beaker was covered with aluminum foil to prevent evaporation of THF. It was then placed in a water bath maintained at a temperature range between 40°-50°. The temperature in the bath was maintained constant through out the dissolution. A glass rod was used as a stirrer and stirring was done 2-3 times.

Complete dissolution was indicated by disappearance of pellets and a clear, thick solution was formed. The solution was poured into a 60 cc syringe, then forced by the plunger into cylindrical molds (10 cc syringes) and allowed to stand at room temperature. Turbidity developed in the solution, and a strong white gel formed on complete gelation. The gel was demolded by blowing air and dried for 5 days in air.

Similar procedure was used for producing 50, 80 and 100% (w/v) samples. The viscosity of the solution increased with increase in polymer content.

b) Sample preparation of algae-PCL gel cast materials (with algae)

100% (w/v) PCL to THF ratio was used to produce samples with algae. Algae was ground for 300 s. A 25% (w/w) solution was made by mixing 5 g of fine ground algae fibers and 20 g of PCL and then dissolving it in 20 ml of THF. The algae did not dissolve in THF and so the solution was not clear. The viscosity increased drastically and it became difficult to pour. The gel was easily demolded. Air blowing was not required. The demolded samples were soaked in methanol for 1 day. The samples were then dried for 5 days.

c) Results

The details of dissolution and gelation times for low molecular weight PCL gel cast samples without algae are given in Table XV. It was observed that the dissolution time increased with polymer content (higher w/v ratio); however, the gelation time decreased with polymer content. A weight loss of 28–34% was observed in the samples after 5 days of drying in the air. This may be due to the evaporation of solvent (THF). The weight loss observed in 25% w/v samples was significantly lower as compared to other compositions. This may be because of the higher gelation time (17 d) for this composition during which most of the THF may have evaporated.

TABLE XV

Compositions with Low Molecular Weight PCL (without algae)

| % Weight/ Volume | Dissolution Time, min (40°–50° C.) | Gelation Time, days | % Weight Loss in 5 days (after gelation) |
|---|---|---|---|
| 25%(w/v) | 50 | 17 | 11.1 ± 5.0 |
| 50%(w/v) | 50 | 17 | 28.0 ± 2.0 |
| 80%(w/v) | 55 | 5 | 34.0 ± 2.0 |
| 100%(w/v) | 63 | 2 | 30.0 ± 6.0 |

A similar trend was observed in samples made by using high molecular weight PCL (Table XVI). Dissolution times increased while gelation times decreased with polymer content. Higher dissolution times were expected in high molecular weight samples. However, the dissolution times were observed to be similar in high and low molecular weight compositions. Gelation times were significantly lower for high mol. wt. compositions as compared to lower mol. wt. samples.

TABLE XVI

Compositions with High Molecular Weight PCL (without algae)

| % Weight/ Volume | Dissolution Time, min (40°–50° C.) | Gelation Time | % Weight Loss in 5 days (after gelation) |
|---|---|---|---|
| 25%(w/v) | 40 | 13 days | 10.2 ± 2.0 |
| 50%(w/v) | 46 | 2 days | 32.2 ± 0.2 |
| 80%(w/v) | 49 | 1 day | 35.2 ± 1.3 |
| 100%(w/v) | 54 | 2 hours | 28.8 ± 1.4 |

The physical properties were measured for the high and low molecular weight PCL gel cast samples and are tabulated in Table XVII. The densities of high and low mol. wt gel cast samples were lower than the density of Polycaprolactones (1.145 g/cm$^3$). The low mol. wt. samples showed large shrinkage in diameter and length. Since high mol wt 100% w/v had lowest gelation time and the lowest shrinkage values, it was selected as the optimum composition for making composites with algae.

TABLE XVII

Physical properties of gel cast samples without algae

| % Weight/ Volume | Density g/cm$^3$ (immediately after gelation) | % shrinkage in diameter (in 5 days after gelation) | % shrinkage in length (in 5 days after gelation) |
|---|---|---|---|
| Low Mol. Wt. PCL | | | |
| 25%(w/v) | 0.65 ± 0.16 | 13.0 | 28.0 ± 2.0 |
| 50%(w/v) | 0.72 ± 0.00 | 28.0 | 22.2 ± 6.0 |
| 80%(w/v) | 0.86 ± 0.08 | 28.0 | 11.0 ± 3.1 |
| 100%(w/v) | 0.88 ± 0.08 | 28.0 | 9.0 ± 4.0 |
| High Mol. Wt. PCL | | | |
| 25%(w/v) | 0.70 ± 0.14 | 13.3 | 20.0 ± 10.0 |
| 50%(w/v) | 0.92 ± 0.01 | 13.3 | 15.5 ± 8.0 |
| 80%(w/v) | 0.95 ± 0.05 | 13.3 | 17.7 ± 3.3 |
| 100%(w/v) | 1.005 ± 0.01 | 13.3 | 9.0 ± 1.4 |

Gel cast samples were made by adding different percentages of algae (Table XVIII). 100% w/v high molecular weight PCL to THF ratio was used. Dry shred algae fibers were used. The average fiber length was in the range between 0.2–0.5 mm.

TABLE XVIII

Dissolution and gelation times in Algae - PCL gel cast samples

| % Weight of algae/ Weight of PCL | Dissolution Time, min | Gelation Time | Density g/cm$^3$ |
|---|---|---|---|
| 0% w/w | 54 | 2 hours | 1.005 ± 0.01 |
| 7.5% w/w | 55 | 1 day | 0.92 ± 0.05 |
| 25% w/w | 65 | 1 day | 1.033 ± 0.02 |
| 50% w/w | 70 | 1 day | 1.137 ± 0.03 |

It was observed that the time required for gelation increased due to the addition of algae. An increase in density was observed on addition of algae. Even with 50% w/w the density of gel cast samples was lower than that of PCL (1.145 g/cm$^3$).

The gel cast samples were immersed in methanol to extract solvent. The weight loss and shrinkage were measured after immersion in methanol (Table XIX). The percent shrinkage was observed to decrease with increase in algae content. The shrinkage in diameter was reduced to 0% with addition of 50% w/w algae.

Weight loss and shrinkage were studied in the different samples. Weight loss and shrinkage were measured after demolding and methanol extraction. At least four samples were studied in each case.

TABLE XIX

Weight loss and shrinkage on methanol extraction

| % weight of algae/ weight of PCL | % Weight loss after methanol extraction | % shrinkage in dia. after methanol extraction | % shrinkage in length after methanol extraction |
|---|---|---|---|
| 0% w/w | 35.2 ± 0.3 | 11.0 | 14.3 ± 1.0 |
| 7.5% w/w | 32.6 ± 1.1 | 7.0 | 14.5 ± 4.0 |

TABLE XIX-continued

Weight loss and shrinkage on methanol extraction

| % weight of algae/ weight of PCL | % Weight loss after methanol extraction | % shrinkage in dia. after methanol extraction | % shrinkage in length after methanol extraction |
|---|---|---|---|
| 25% w/w | 33.0 ± 0.5 | 7.0 | 9.9 ± 2.0 |
| 50% w/w | 28.3 ± 1.0 | 0.0 | 5.1 ± 1.5 |

Scanning Electron microscopy (SEM) was used to study the microstructures in the samples. The gel cast samples were reported to be microporous. Large macropores were observed in samples without algae. Macroporosity was observed to decrease with increase in algae content. Samples with 50% w/w showed negligible macroporosity. The pore size was larger in 50% w/w samples.

SEM was also used to study the dispersion of fibers in PCL matrix. Samples were cut to 10 mm length and the surface was examined. Because the melting point of PCL gel samples is low (65° C.), care was required during coating. A current of 10 mA was used for 1 minute followed by 4 minutes of cooling before recoating in a Carbon coater. The coating procedure was repeated ten times. Uniform dispersion was observed in algae-PCL samples.

Algae fibers were not exposed at the cut surface which illustrated good wettability of the fibers by the polymer. The cut surface was rough.

From these observations, it may be concluded that there was apparent compatibility between algae fibers and PCL.

Compressive mechanical properties were measured with different algae content and are presented in Table XX. Test specimens were in the form of cylinders, 10 mm long and 10 mm diameter. Samples were machined to 10 mm diameter. At least three samples were tested for each composition. The test was done on an Instron machine of 500 Kg load capacity by loading the samples at a rate of 1 mm per min. Since the materials could not be tested to failure, compressive strength was measured at 10% deformation.

TABLE XX

Compressive properties in gel cast samples

| % wt of algae/ wt of PCL | Compressive Strength, MPa | Compressive Modulus, MPa | % Strain at 80 Kg load |
|---|---|---|---|
| 0.0% w/w | 8.62 ± 0.18 | 96 ± 4 | 11.5 ± 2.1 |
| 7.5% w/w | 8.74 ± 0.43 | 93 ± 8 | 12.3 ± 0.6 |
| 25.0% w/w | 8.82 ± 1.01 | 110 ± 20 | 14.3 ± 0.6 |
| 50.0% w/w | 7.99 ± 0.35 | 108 ± 12 | 16.5 ± 0.7 |

The compressive strength values did not show much difference even with addition of 50% w/w algae content. However, a decreasing trend was observed. Modulus values were also fairly constant but the trend showed increase in modulus with algae content. A remarkable increase in percent strain was observed with increase algae content. The area under the stress-strain curve showed increase with higher algae content.

From the above results, it may be concluded that addition of algae results in an increase in toughness of samples.

Differential Scanning Calorimetry (DSC) was used for the measurement of melting temperature of the gel cast materials. The melting peak of the gel for 100% w/v PCL was observed at 65° C., which was slightly higher than the melting temperature of pure PCL (60° C.). Vaporization of PCL started at 260° C.

The changes in thermal behavior in gel cast samples due to the addition of algae fibers were recorded using a Perkin-Elmer DSC-7 (Norwalk. Conn.) differential scanning calorimeter. Sample weight was 10.8 mg. The heating rate was 10° C. min$^{-1}$ over a temperature range between 0° and 600° C. Percentage crystallinity of samples was calculated from the sample heat of fusion using the system's 'Peak' software facility.

Gel cast samples with algae fibers (7.5, 25 and 50% w/w) showed endothermic transitions around 240° C. which may correspond to degradation of algae fibers. The melting temperatures of the gel were not observed to change with algae content. However, differences in the heat of melting were observed (Table XXI). Heat of melting increased with addition of algae which can be calculated from the area under the melting peak.

This indicates an increase in crystallinity due to the addition of algae. The increase in crystallinity due to addition of algae content may result in longer resorbable time of samples. Therefore algae content can be used as a factor to tailor the resorption rate in PCL.

TABLE XXI

Effect of algae content on thermal properties

| % wt of algae/ wt of PCL | Melting Peak, C. | Heat of melting, J/g |
|---|---|---|
| 0.0% w/w | 64.9 | 54.3 |
| 7.5% w/w | 65.9 | 60.6 |
| 25.0% w/w | 65.3 | 64.8 |
| 50.0% w/w | 65.3 | 70.6 |

A sharp decrease in modulus in the temperature range between −60° to −30° C. was observed.

The dynamic mechanical properties were evaluated during 3 point bending using a Perkin-Elmer DMA-7 dynamic mechanical analyzer. The temperature scan mode was used and frequency of the forced oscillation was kept at 1 Hz. The static force was 1000 mN and the dynamic force was 900 mN. The samples were 22 mm in length, 4 mm wide and 1 mm in thickness. A minimum of three samples were tested for each type. The heating rate was 5° C. min$^{-1}$ over a temperature range between −130° and 50° C.

DMA curve for 7.5 wt % algae was similar to that of 0 wt % algae. However, slightly lower dynamic modulus was observed. The modulus decreased slightly with increase in algae content.

In case of algae/PCL gel cast samples, the crystallinity was observed to increase with addition of algae, and a slight decrease in modulus was observed.

Gel cast samples (10 mm dia. by 10 mm thickness) were weighed and immersed in 100 ml of water. Water absorption was measured in 11 days. Percent weight gain in samples was reported. Gel cast samples with 50% w/w showed highest water absorption. This may be due to water absorption by algal fibers or due to the larger pore size observed in algae-PCL samples. The higher water absorption observed in samples with algae may correspond to higher resorbability possibly due to higher infiltration of fluids. Despite the increased crystallinity in samples with algae, these samples showed high resorbability.

d) Preparation of Golf Tees

An impression of a typical golf tee was machined in a block of aluminum. This served as the mold for the production of the golf tee. In a typical experiment, about 8 g of was algae was ground for 300 s and mixed with 14 g of low molecular weight PCL. This was mixed with 10 ml of THF and heated to dissolve the PCL. After all the PCL had dissolved, the solution containing the algae was poured into the aluminum mold. The samples were allowed to gel in the mold. After gelling (typically after 72 hr), the samples were demolded and placed in methanol to extract the THF. After keeping in methanol for 24 hr, the samples were removed and stored in a desiccator. Several samples were produced with varying amounts of algae to PCL ratios.

Up to 40% algae was incorporated in the PCL samples. The samples were lighter than conventional golf tees and exhibited a lateral shrinkage after the extraction from methanol. The shrinkage was reduced with the addition of algae.

EXAMPLE 15

Algal fibers were incorporated in polymer matrix to produce foamed and dense products. Microwave heating and extrusion techniques were used to produce foamed samples. Dense samples were produced by injection molding and gel casting processing methods. Synthetic (HIPS) and biodegradable (Starch, Polycaprolactones) polymers were used as a matrix for algal fibers.

Five different types of starches were used: 1) Rice, 2) Corn, 3) Tapioca, 4) Arrowroot, and 5) Potato. Modifiers were incorporated in starch formulations with an attempt to improve properties. Four different types of modifiers were used, namely, Polyvinyl alcohol (low molecular weight), Polyvinyl alcohol (high viscosity), Polyethylene glycol, and glycerol. A General Electric microwave with 800 Watts capacity was used.

Algae fibers were ground for 300 s. Foams were made by mixing starch, algae fibers and water together and subjecting the mixture to microwave heating. The optimum composition for rice starch foams was observed as follows:

Starch: 16 g

Algae: 4.8 g

Water: 35 ml

A Poly(ethylene) cylindrical mold was used. Holes (3 mm dia) were provided on the circumference to vent steam. The same composition was used with different percentages of PVA and PEG modifiers. Compositions for Glycerol modifier and the different types of starches are listed in Table XXII. Weight loss measurements were conducted during foaming. Hardness tests were done according to ASTM D 2240. A Rex durometer of H 1000 type was used. Compressive properties were measured on an Instron machine (Instron Corp., Canton, Mass.) at a strain rate of 2.5 mm per minute. Testing speed was in accordance to ASTM D 1621. The samples were 50 mm in diameter and 13 mm in height. Two samples were used together to achieve the required height of 26 mm. Samples could not be made with a larger surface area than 20 cm$^2$. Cut samples were coated with Au—Pd and studied under microscope. In some cases the foam was crushed and the powder was observed under SEM to study the gelatinization of starch granules. Water absorption was calculated according to ASTM D 570 (2 hr immersion test).

TABLE XXII

List of materials and their Suppliers

| Material | Specification | Supplier |
|---|---|---|
| Glutenous rice starch | Food grade | Erawan Mktg. Co., Bangkok, Thailand |
| Corn Starch | Food grade | Argo Starch, CPC Intl. |
| Tapioca Starch | Food grade | Erawan Mktg. Co., Bangkok, Thailand |
| Arrowroot Starch | Food grade | Leco Corporation, St. Joseph, Michigan |
| Potato Starch | Food grade | A E Stalley Mfg. Co., Declaur, Illinois |
| Poly(vinyl alcohol) (L) | High Viscosity | Aldrich Chemical Co., Milwaukee, WI |
| Poly(vinyl alcohol) (H) | Low Mol. Wt. (13,000–23,000) | City Chemical Corp., New York |
| Poly(ethylene glycol) | Molecular Weight (100,000) | Aldrich Chemical Co., Milwaukee, WI |
| Glycerol | Reagent ACS | Eastman Kodak Co., Rochester, New York |

Table XXIII indicates the optimum composition determined for different types of starches used.

TABLE XXIII

Optimum composition for different types of starches

| Starch | Algae, g | Starch, g | Glycerol, g | Water, ml | Time*, s |
|---|---|---|---|---|---|
| G. Rice | 4.8 | 16.0 | 1.2 | 21.0 | 60 |
| Corn | 4.8 | 16.0 | 1.2 | 14.0 | 60 |
| Tapioca | 4.8 | 16.0 | 1.2 | 15.0 | 45 |
| Arrowroot | 4.8 | 16.0 | 1.2 | 16.0 | 60 |
| Potato | 4.8 | 16.0 | 1.2 | 16.0 | 60 |

EXAMPLE 16

Novon pellets (extrudable grade) were supplied by Novon Products (Rockford, Ill.). Algae was ground for 180 s. Dry shred algae and pellets were hand mixed and fed into the extruder hopper. A co-rotating twin screw extruder was used. The barrel temperature was at 200° C. The screw speed was 200 rpm. The end of the extruder was equipped with a die plate which held two circular openings. An adjustable die face cutter was operated at the same speed for different compositions. Three compositions were used during extrusion (0, 2 and 10% weight algae content).

The cut extrudate samples were sealed in polyethylene bags and stored for analysis. The diameters and lengths were measured in ten samples of each compositions. In preparing samples for scanning electron microscopy, a razor blade was used to expose cross-sections perpendicular to direction of extrusion. The samples were coated using a sputter coater. Samples were coated at 15 mA for 3 minutes and cooling time of 5 minutes between two coatings. Water disintegration tests were done by immersing samples in water. Time taken for complete solubilization of samples (0.15 g) was noted. Hardness was measured according to ASTM D 2240. A Rex durometer (H 1000-OO Scale) was used.

EQUIVALENTS

Those skilled in the art will recognize, or be able to ascertain using no more than routine experimentation, numerous equivalents to the specific procedures and compositions described herein. Such equivalents are considered to be within the scope of this invention and are covered by the following claims.

We claim:

1. A method of forming a solid packing material comprising subjecting a filamentous green algal pulp to a plastic forming process which results in a solid algal fiber matrix having a substantial degree of dimensional stability, wherein said pulp is prepared by pulping a filamentous green algal mass using a pulping process which is selected to substantially retain the fibrous structure of the algae, while minimizing damage to the inherent fiber structure of the filamentous green algae.

2. The method of claim 1, wherein said plastic forming process comprises a molding process to generate said solid algal fiber matrix.

3. The method of claim 1, wherein said molding process comprises a blow molding process.

4. The method of claim 1, wherein said molding process comprises an injection molding process.

5. The method of claim 1, wherein said molding process comprises a compression molding process.

6. The method of claim 1, wherein said molding process comprises a transfer molding process.

7. The method of claim 1, wherein said molding process comprises a rotational molding process.

8. The method of claim 1, wherein said plastic forming process comprises an extrusion process to generate said solid algal fiber matrix.

9. The method of claim 1, wherein said plastic forming process comprises a calendering process to generate said solid algal fiber matrix.

10. The method of claim 1, wherein said plastic forming process comprises a casting process to generate said solid algal fiber matrix.

11. The method of claim 10, wherein said casting process comprises a gel casting process.

12. The method of claim 10, wherein said plastic forming process comprises a thermoforming process to generate said solid algal fiber matrix.

13. The method of claim 10, wherein said filamentous algal pulp is prepared by pulping a filamentous green algal mass using a pulping process selected from the group consisting of a mechanical pulping process, a chemical pulping process, a biological pulping process, and combinations thereof.

14. The method of claim 1, wherein said filamentous algal pulp is further prepared by admixing at least one additive with said pulped algal mass.

15. The method of claim 14, wherein said additive is selected from the group consisting of antioxidants, antistatic agents, compatibilizers, flame retardants, heat stabilizers, water repellents, impact modifiers, lubricants, ultraviolet stabilizers, biocides, pigments, colorants, fillers, impact modifiers/plasticizers, viscosity modifiers, and combinations thereof.

16. The method of claim 1, further comprising adding a crosslinking agent to said pulp.

17. The method of claim 16, wherein said crosslinking agent is selected from the group consisting of diisocyanates, glutaraldehyde, melamine formaldehyde and urea formaldehyde.

18. The method of claim 17, wherein said diisocyanates are toluene diisocyanate (TDI), diphenylmethane diisocyanate (MDI) and polymethylene polyphenyl isocyanate (PAPI).

19. A method of forming a solid packing material comprising subjecting a filamentous green algal pulp to a plastic forming process which results in a solid algal fiber matrix having a substantial degree of dimensional stability, wherein said pulp is prepared by pulping a filamentous green algal mass using a pulping process which is selected to substantially retain the fibrous structure of the alge, while minimizing the damage to the inherent fiber structure of the filamentous green algae wherein said solid algal fiber matrix is formed in a shape of a golf tee.

20. A method of forming a solid packing material comprising subjecting a filamentous green algal pulp to a transfer molding process which results in a solid algal fiber matrix having a substantial degree of dimensional stability, wherein said pulp is prepared by pulping a filamentous green algal mass using a pulping process which is selected to substantially retain the fibrous structure of the algae, while minimizing damage to the inherent fiber structure of the filamentous green algae.

21. A method of forming a solid packing material comprising subjecting a filamentous green algal pulp to a rotational molding process which results in a solid algal fiber matrix having a substantial degree of dimensional stability, wherein said pulp is prepared by pulping a filamentous green algal mass using a pulping process which is selected to substantially retain the fibrous structure of the algae, while minimizing damage to the inherent fiber structure of the filamentous green algae.

22. A method of forming a solid packing material comprising subjecting a filamentous green algal pulp to an extrusion process which results in a solid algal fiber matrix having a substantial degree of dimensional stability, wherein said pulp is prepared by pulping a filamentous green algal mass using a pulping process which is selected to substantially retain the fibrous structure of the algae, while minimizing damage to the inherent fiber structure of the filamentous green algae.

23. A method of forming a solid packing material comprising subjecting a filamentous green algal pulp to a casting process which results in a solid algal fiber matrix having a substantial degree of dimensional stability, wherein said pulp is prepared by pulping a filamentous green algal mass using a pulping process which is selected to substantially retain the fibrous structure of the algae, while minimizing damage to the inherent fiber structure of the filamentous green algae.

* * * * *